United States Patent
Ito et al.

(10) Patent No.: US 7,542,167 B2
(45) Date of Patent: *Jun. 2, 2009

(54) SMOOTHING LATTICE POSITIONS

(75) Inventors: Takashi Ito, Nagano-ken (JP);
Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 434 days.

This patent is subject to a terminal disclaimer.

(21) Appl. No.: 11/345,072

(22) Filed: Jan. 31, 2006

(65) Prior Publication Data

US 2006/0193018 A1    Aug. 31, 2006

(30) Foreign Application Priority Data

Feb. 2, 2005   (JP)   ............... 2005-026440

(51) Int. Cl.
*H04N 1/60* (2006.01)
(52) U.S. Cl. .................. 358/1.9; 358/518; 358/523; 382/162; 382/167
(58) Field of Classification Search .............. 358/1.9, 358/518, 523; 382/162, 167
See application file for complete search history.

(56) References Cited

U.S. PATENT DOCUMENTS

| | | | | |
|---|---|---|---|---|
| 6,215,561 | B1 * | 4/2001 | Kakutani | ............... 358/1.9 |
| 6,650,772 | B1 * | 11/2003 | Inoue et al. | ............... 382/162 |
| 7,136,523 | B2 * | 11/2006 | Fukao et al. | ............... 382/167 |
| 7,345,787 | B2 | 3/2008 | Ito et al. | |
| 7,369,272 | B2 | 5/2008 | Ito et al. | |
| 2004/0263880 | A1 | 12/2004 | Ito et al. | |
| 2004/0263881 | A1 * | 12/2004 | Ito et al. | ............... 358/1.9 |
| 2005/0128498 | A1 * | 6/2005 | Matsuzaki | ............... 358/1.9 |
| 2005/0280846 | A1 * | 12/2005 | Ichitani | ............... 358/1.9 |
| 2006/0176529 | A1 * | 8/2006 | Ito et al. | ............... 358/518 |

FOREIGN PATENT DOCUMENTS

| | | |
|---|---|---|
| JP | 2003-116012 | 4/2003 |
| JP | 2004-320624 | 11/2004 |
| JP | 2004-320625 | 11/2004 |

(Continued)

OTHER PUBLICATIONS

Abstract of Japanese Patent Publication No. 2003-116012, Pub. Date: Apr. 18, 2003, Patent Abstracts of Japan.

(Continued)

*Primary Examiner*—Mark K Zimmerman
*Assistant Examiner*—Miya J Cato
(74) *Attorney, Agent, or Firm*—Martine Penilla & Gencarella, LLP

(57) ABSTRACT

A profile is created for making correspondence between a lattice point in an ink color space composed of ink colors and a lattice point in a device-independent color space by: defining a virtual force acting on a focused lattice point in a device-independent color space and obtaining the focused lattice position in a stable state reached when the virtual force acts on the focused lattice point; and working based on a transform model for transforming a lattice point in the ink color space into a lattice point in the device-independent color space to obtain a lattice point in an ink color space corresponding to a focused lattice position in the stable state and creating the profile by making correspondence between both.

14 Claims, 13 Drawing Sheets

FOREIGN PATENT DOCUMENTS

JP 2004-320626 11/2004

OTHER PUBLICATIONS

Abstract of Japanese Patent Publication No. 2004-320624, Pub. Date: Nov. 11, 2004, Patent Abstracts of Japan.

Abstract of Japanese Patent Publication No. 2004-320625, Pub. Date: Nov. 11, 2004, Patent Abstracts of Japan.

Abstract of Japanese Patent Publication No. 2004-320626, Pub. Date: Nov. 11, 2004, Patent Abstracts of Japan.

* cited by examiner

FIG. 3
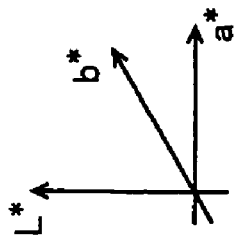
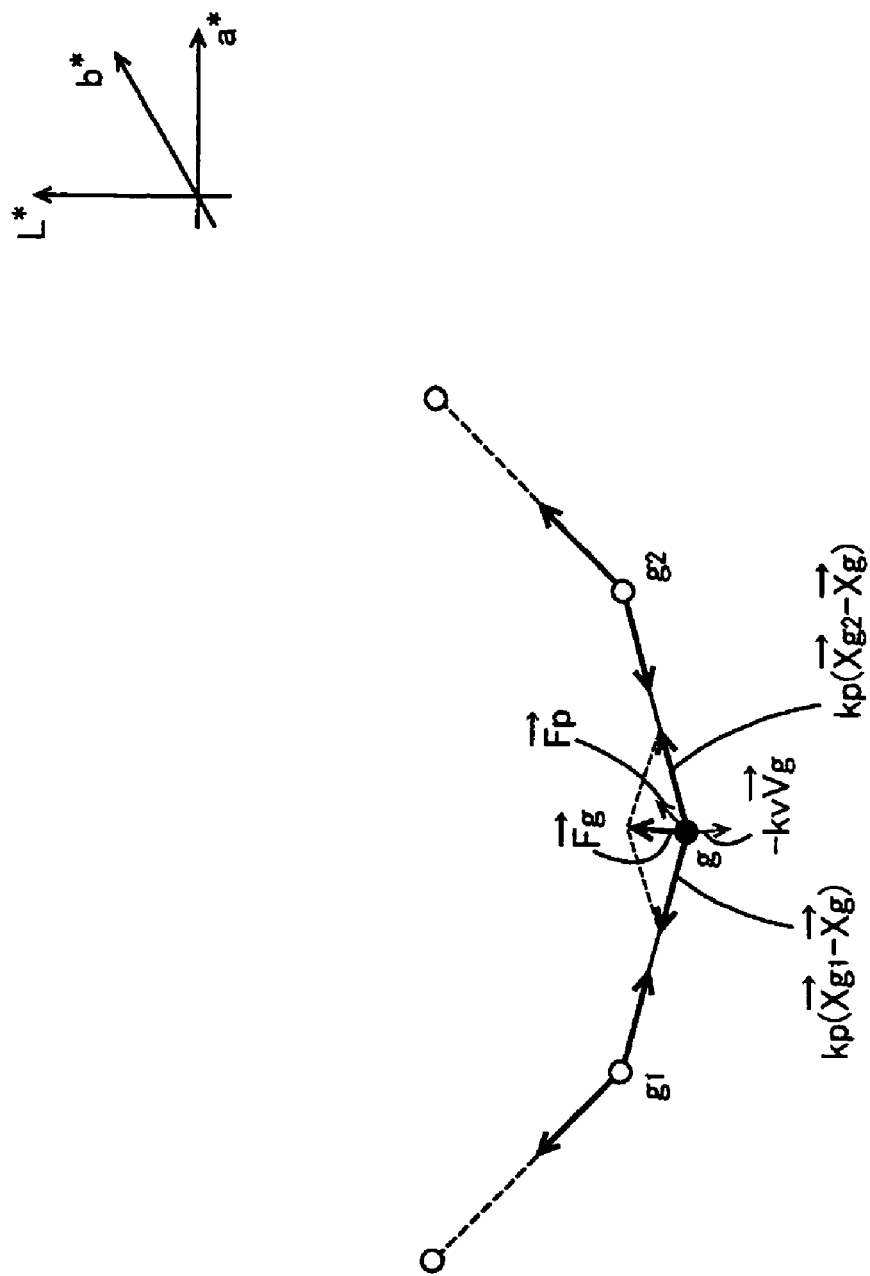

FIG. 10
(A) Spectral Neugebauer model
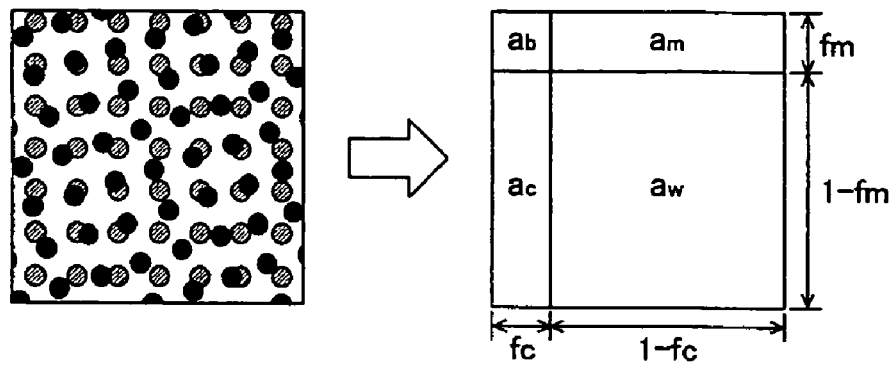
$$R(\lambda) = a_w R_w(\lambda) + a_c R_c(\lambda) + \cdots + a_k R_k(\lambda)$$
$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$
(B) Murray-Davis model
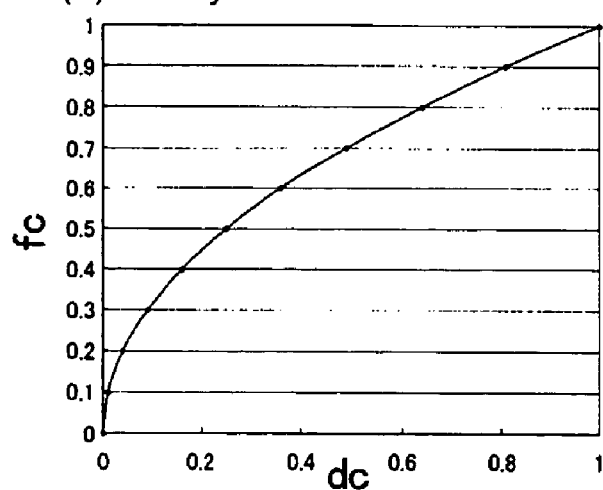
$$f_c = f_{1D-LUT}(d_c)$$

FIG. 11
(A) Cellular Yule-Nielsen spectral Neugebauer model
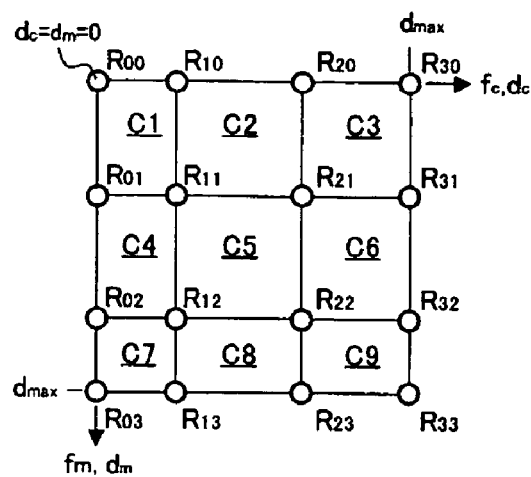
(B) Ink coating ratio fc(d)
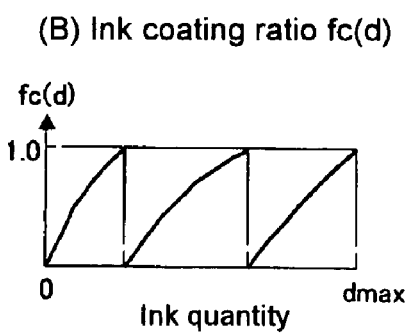
(C) Calculating spectral reflectivity $Rsmp(\lambda)$
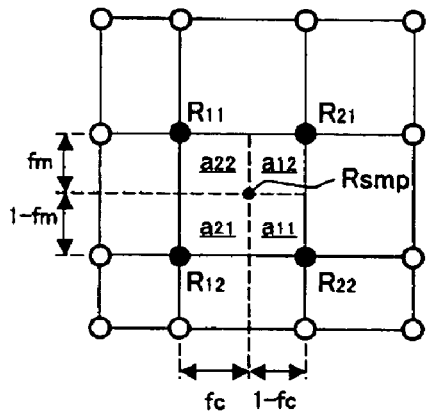
$$Rsmp(\lambda) = \left(\sum a_i R_i(\lambda)^{1/n}\right)^n$$
$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$
$$a_{11} = (1 - f_c)(1 - f_m)$$
$$a_{12} = (1 - f_c) f_m$$
$$a_{21} = f_c (1 - f_m)$$
$$a_{22} = f_c f_m$$

$$R(\lambda)=\{a_w R_w(\lambda)^{1/n}+a_c R_c(\lambda)^{1/n}+a_m R_m(\lambda)^{1/n}+a_b R_b(\lambda)^{1/n}\}^n$$

$$a_w = (1-f_c)(1-f_m)$$
$$a_c = f_c(1-f_m)$$
$$a_m = (1-f_c)f_m$$
$$a_b = f_c f_m$$

SMOOTHING LATTICE POSITIONS

The entire disclosure of Japanese Patent Application No. 2005-026440, filed Feb. 2, 2005, is expressly incorporated by reference herein.

BACKGROUND OF THE INVENTION

1. Field of the Invention

The present invention relates to a technology of smoothing the arrangement of lattice points when a profile is created.

2. Description of Related Art

Imaging devices such as displays and printers normally use color image data whose pixel colors are tonally rendered with specific color components. Image data defines colors using various color spaces such as RGB and CMY-based color spaces, for example. The RGB color space uses three colors R (red), G (green), and B (blue). The CMY-based color space (including light cyan lc, light magenta lm, dark yellow DY, and black K) uses C (cyan), M (magenta), and Y (yellow). These colors are generally specific to imaging devices. A color correction LUT (lookup table) is used to define correspondence between colors for devices so that various imaging devices can output the same image in same colors.

In consideration for saving the storage capacity or improving the workability to create the color correction LUT, it is impracticable for the color correction LUT to define the correspondence between all colors the imaging devices can output. Generally, the color correction LUT defines the correspondence between a specified number of representative colors. An interpolation operation is used to calculate the correspondence for the other colors. That is, no color measurement is performed for a large number of colors. The color measurement is performed by outputting colors from an imaging device within a range capable of actual color measurement to prescribe the color correction LUT for a specified number of representative colors.

The interpolation operation accuracy depends on the arrangement of lattice points formed in a color space using representative colors defined in the color correction LUT. That is, the interpolation operation generates information about a lattice point to be interpolated from information about a lattice point near that lattice point. When the lattice point arrangement is unsmooth, the interpolation accuracy degrades to increase the possibility of generating a tone jump or a color distortion. To solve this problem, there is known the technology of smoothing the lattice point arrangement (e.g., JP-A No. 116012/2003). Conventionally, lattice points are positioned in the RGB color space or the CMY-based color space. A three-dimensional filter is used to smooth the relationship between a given lattice point and surrounding ones.

The above-mentioned conventional smoothing technology maintains the color gamut or constrains a specific lattice point to a specific position before and after smoothing. As a whole, it has been difficult to obtain smooth lattice points. To ensure as wide a color gamut as possible in the color correction LUT, it is necessary to not only maintain lattice points positioned to the color gamut boundary, but also smooth the arrangement. To maintain a specific color such as gray, it is necessary to not only arrange lattice points on the gray axis, but also smooth the relationship with the surrounding lattice points. While the conventional technology takes a weighted average of the smoothed state and the unsmoothed state, there is not necessarily a relationship between the weighted average and the smoothed ideal arrangement. It has been impossible to smooth the lattice point arrangement by providing detail conditions such as maintaining the color gamut and fixing an intended lattice point to an intended color as mentioned above.

SUMMARY

The present invention has been made in consideration of the foregoing. It is therefore an object of the present invention to provide a smoothing technology capable of reliably smoothing the lattice point arrangement and taking various conditions into consideration as needed.

In order to achieve the above-mentioned object, there is defined a virtual force acting on a lattice point. This virtual force moves the lattice point. After reaching a stable state, the lattice position is assumed to be the one after smoothing. When the virtual force is defined for a focused lattice point each assumed in the device-independent color space, it is possible to simulate how the virtual force moves lattice points. Let us suppose that the virtual force acts on each lattice point to reach the stable state where the lattice position does not vary anymore. In this case, there is formed an orderly state that approximately balances the virtual forces acting on the lattice points.

The present invention uses the thus generated orderly lattice position as a profile's lattice position. We found that the lattice positions simulated in this manner are capable of very highly accurate interpolation. That is, the above-mentioned simulation smoothes the lattice point arrangement. When the stable state is maintained by allowing the virtual force to act on unsmoothed initial lattice points, it is possible to create a profile that is smoothed based on stable lattice positions.

The profile created in the present invention makes the correspondence between a lattice point in the ink color space and a lattice point in the device-independent color space. A lattice point in the ink color space is composed of a tone value for each ink used for a printer. Generally, it is impossible to objectively specify a color straight from a combination of these tone values. On the other hand, a lattice point in the device-independent color space is composed of a tone value for each color component in the device-independent color space. This color can be strictly specified. Accordingly, the use of the profile for making the correspondence between both can specify a color represented by the lattice point in the ink color space. This profile is smoothed because it is created based on focused lattice positions in the above-mentioned stable state.

The smoothness of lattice point arrangement signifies the degree of distortion that may result from lattice points placed in the space. For example, there is no distortion when lattice points are cubically arranged in the device-independent color space. When each lattice point deviates from the cubic lattice position, a lattice distortion increases. The high smoothness is supposed to be maintained when lattice points are evenly arranged in the device-independent color space. Let us assume a curve that connects adjacent lattice points in the device-independent color space and is drawn from one boundary to the other of a color gamut formed in the device-independent color space. As the curve is represented in a higher dimensional function, the smoothness may be considered to be low.

As a general practice to interpolate colors, lattice points orderly arranged in a color space may be referenced to interpolate lattice points in another color space. In this case, the interpolation is available without largely varying the interpolation accuracy due to local positions in the color space. By smoothing lattice positions, the present invention can improve the accuracy of calculating lattice points in the ink color space by referencing lattice points in the device-independent color space. Once a profile according to the present invention is created, it is possible to accurately calculate lattice points (i.e., tone values for respective ink colors) in the ink color space from lattice points in the device-independent color space.

On the other hand, the present invention previously creates a transform model that transforms lattice points in the ink color space into lattice points in the device-independent color space. The use of this transform model is a precondition. Accordingly, the use of the transform model can transform lattice points in the ink color space into lattice points in the device-independent color space. However, it is impossible to transform lattice points in the device-independent into lattice points in the ink color space. This transform can be accurately implemented by creating the profile smoothed by the present invention.

A requirement in the present invention is to be able to create a profile smoothed based on the above-mentioned transform model after lattice points in the device-independent color space reach the stable state. Accordingly, it may be preferable to employ a configuration that directly uses the transform model or another configuration that uses the transform model to create a reference profile and references this reference profile. For example, considerations may include the granularity and the like based on the quantity of ink used for ink-color lattice points, the tolerance for the color gamut width or metameric colors, and the like according to lattice points in the device-independent color space obtained based on the transform model. In view of these considerations, a preferable ink-color lattice point is selected. There is provided a profile that makes correspondence between the ink-color lattice point and a lattice point in the device-independent color space. This profile may be used as the reference profile.

Various transform models can be employed as long as lattice points in the ink color space can be transformed into lattice points in the device-independent color space. For example, data corresponding to lattice points in the ink color space maybe used to simulate spectral reflectances of a recording medium and a recording material recorded on the recording medium. When the spectral reflectances are given, a known equation may be used to easily obtain lattice points in the device-independent color space.

The above-mentioned focused lattice point is not limited to a specific initial position. In order to control the color gamut size, however, it is preferable to previously determine whether or not the lattice point is positioned to a color gamut boundary (outmost contour). For example, lattice points may be sequentially numbered to define focused lattice points so that specific numbers are arranged on the color gamut boundary. A focused lattice point belongs to the device-independent color space and its initial position may be determined independently of lattice points in the ink color space. It may be preferable to determine an ink-color lattice point corresponding to the initial position and assume a lattice point transformed by the above-mentioned transform model to be the focused lattice point. In any case, the virtual force is defined by assuming all lattice points in the device-independent color space to be focused lattice points. Of course, the lattice point movement needs to stop finally as the time elapses. The virtual force is dependent on lattice positions and the time.

After the stable state is reached, the profile according to the present invention can be created by making correspondence between the lattice point and a lattice point in the ink color space. At this time, the above-mentioned transform model is used because it is impossible to accurately calculate the lattice point in the ink color space from the lattice point in the device-independent color space. That is, the optimization process using the transform model determines the ink-color lattice point corresponding to the lattice point that has already reached the stable state. This calculation can be replaced by known numeric operations and the like.

The virtual force acting on focused lattice points just needs to be able to change lattice positions to the stable state and finally smooth the lattice point arrangement. Various forces can be employed as the virtual force. The virtual force preferably depends on a relative positional relationship between the focused lattice point and an adjacent lattice point. For example, an employable force varies its magnitude so as to increase in proportion to a distance between the focused lattice point and the adjacent lattice point adjacent thereto. This force is caused by lattice points that attract each other.

Due to this force, the focused lattice point is attracted by multiple adjacent lattice points and changes its position. Decreasing a resultant force in relation to adjacent lattice points also decreases the force to move the focused lattice point. The focused lattice point reaches the stable state in the end. Various forces can be considered as such force. As an example, it is possible to employ a force that is proportional to the distance. The force is similar to a spring vibration in the natural world. Therefore, lattice points behave similarly to the vibration. When lattice points change positions by vibration, a force distortion can be relaxed more easily than they move straight. The lattice points can more reliably move to the stable state. The force is preferably oriented to a direction along which lattice points are connected with each other. Such force causes the stable state to be highly symmetric from the geometric viewpoint in such a manner that lattice points are arranged on a straight line. The lattice point arrangement can be smoothed more effectively.

As another virtual force, it may be preferable to introduce a resultant force to stop the lattice point movement as the time elapses. For example, it is possible to employ a resultant force whose magnitude is proportional to the speed of a moving focused lattice point. This force acts on a mass point in the natural world. Introducing the force can simulate the lattice point movement similarly to the behavior of a mass point in the natural world.

Even when multiple lattice positions move, there may be a case where it is preferable to fix part of all the lattice points. For example, let us focus on a given lattice point between color gamut vertexes. Let us suppose to fix a lattice point corresponding to the color gamut vertex and the focused lattice point. Let us suppose that lattice points between the vertex and the focused lattice point can freely move so as to smooth the arrangement. On the other hand, the virtual force is assumed to be mainly composed of the attraction acting in the direction along which the lattice points are connected with each other. The stable state is formed by the fixed lattice point and the other lattice points and provides a polygonal line plotted by connecting the focused lattice point with the vertexes at both ends.

The focused lattice point is connected to the vertexes to form a series of lattice points. The series is preferably a curve resulting from smoothly connecting the three lattice points when they are fixed. When there is provided a fixed lattice point such as the focused lattice point, it is preferable to define the virtual force so as to reach a desirable stable state. When a given virtual force acts on an adjacent lattice point adjacent to the focused lattice point, for example, a force reverse to this force can be included in the virtual force acting on the focused lattice point. When this force acts on the focused lattice point, it is possible to achieve a state that balances a resultant force of virtual forces acting on focused lattice points. This also applies even to a case where lattice points are not arranged so as to form a polygonal line and there is no zero resultant force of attractions acting in directions to connect the lattice points with each other. Accordingly, even when lattice points are not arranged on a straight line, it is possible to achieve the stable state that stops lattice points.

As mentioned above, in the state where the virtual force remains active, all focused lattice points are moved to reach the stable state. As a configuration suitable for simulating this, it is possible to employ the simulation based on the equation that describes the movement due to the virtual force. When the virtual force can be defined for the focused lattice points whose positions are specified, a dynamic equation can be used to describe the speeds and positions.

Since the virtual force can vary with focused lattice positions and the time, the above-mentioned equation to describe speeds and positions allows for the lapse of an infinitesimally small time interval. As a result, it is possible to obtain focused lattice positions and speeds after the lapse of the infinitesimally small time interval. When an equation defines the virtual force after the lapse of the infinitesimally small time interval and again describes speeds and positions, such equation can sequentially obtain changes in the lattice positions and speeds in accordance with the lapse of time. Accordingly, the determination whether or not the speed satisfies a specified condition makes it possible to determine whether or not the stable state is reached.

The present invention creates the profile that enables data transform in different color coordinate systems. To make the profile usable, it is preferable to constrain lattice points to intended positions. A possible example is to constrain a lattice position in the device-independent color space to the inside of the color gamut (including along the boundary line and on the boundary surface). The color gamut can be defined as a region that resides in the device-independent color space and is obtained by using the above-mentioned transform model to transform a given lattice point included in the ink color space. A focused lattice position may be corrected so as to be included in a region formed by points that reside in the device-independent color space and are obtained by transforming any points contained in the ink color space. In this manner, the focused lattice position can be constrained to the inside of the color gamut.

Various techniques can be employed to provide such constraint. In the above-mentioned configuration, for example, lattice positions and speeds are simulated in accordance with the lapse of the infinitesimally small time interval. In this case, a correction just needs to be made each time a lattice position is calculated after the lapse of the infinitesimally small time interval. Correcting lattice positions may degrade the smoothness of lattice points. However, the lapse of the infinitesimally small time interval causes a very small positional variation in lattice points. Accordingly, the simulation can be performed so as to constrain lattice positions to the color gamut inside by possibly suppressing the degree of degrading the smoothness due to the correction.

The correction is preferably made so that a given focused lattice point is constrained to a specific portion of the color gamut. For this purpose, a focused lattice position just needs to be corrected so that the focused lattice point approaches the specific portion in the device-independent color space. For example, the color gamut can be enlarged by placing a focused lattice point positioned to the color gamut boundary (color gamut's outmost contour) as outside the color gamut as possible. In consideration for this, a correction is made to place the focused lattice point on the color gamut boundary as outside the color gamut as possible. At this time, various configurations can be employed. A possible example is to approximately maintain the luminosity and the hue at the focused lattice point after the lapse of the infinitesimally small time interval and make a correction so that the chroma approximates to the maximum in the color gamut.

It is possible to constrain focused lattice points not only at the color gamut boundary, but also at any positions in the color gamut to a specific portion. For example, it is possible to constrain various lattice points equivalent to specific colors such as a specific region in the device-independent color space, lattice points equivalent to the achromatic color, and the like. When determining a focused lattice position after the correction, it may be preferable to define an equation for determining the position after the correction and provide the equation with a constraint condition. In this manner, the lattice position can be constrained to an intended position.

Various conditions can be employed as the constraint condition. An available condition may constrain a lattice point so as to use a specific lattice point in the ink color space, constrain a lattice point to a portion in the device-independent color space, or constrain a lattice point to a predetermined portion (e.g., a predetermined curve) in the device-independent color space.

The correction may be made after the lapse of an infinitesimally small time interval so that the lattice point is constrained to a specific portion in the color gamut each time that correction is made. To prevent an excessive correction, a lattice point may be corrected so as to possibly approach a specific portion in the color gamut. In this case, it is preferable to configure the correction to be available in any directions as long as a correction amount is within a predetermined allowable range. According to this configuration, the correction is freely available within the allowable range. The stable state can be easily reached.

When the allowable range is always constant, the lattice position may deviate from a specific portion of the color gamut in the finally achieved stable state. In consideration for this, the allowable range is preferably configured to be narrowed as the time elapses. According to this configuration, the constraint condition becomes stringent as the time elapses. The final stable state can provide control so that the lattice position approximately matches the specific portion of the color gamut.

Reference to the profile created as mentioned above makes it possible to create a color correction profile that defines the correspondence between lattice points in different color coordinate systems. For example, the color correction profile defines the correspondence between image data for the printer using the above-mentioned inks and image data for a specific imaging device (e.g., a display). When a predetermined standard such as sRGB is applied to the image data used for the specific imaging device, it is possible to determine the correspondence between the image data and lattice points in the device-independent color space. Accordingly, reference to the profile created according to claim 1 and the like can easily define the correspondence between image data for the printer using the above-mentioned inks and image data used for the specific imaging device. Such profile can be used as the color correction profile.

Of course, the present invention can be embodied as not only a method, but only an apparatus and a program that performs processes according to the method. Further, the present invention can be embodied as a print control apparatus, a method, and a program to use the above-mentioned color correction profile for color transform. An apparatus, a method, and a program according to the present invention may be independently available or may be included in a given device to be used with the other apparatuses, methods, and programs. The present invention is not limited thereto but may be otherwise variously embodied within the spirit and scope of the invention. Various changes and modifications may be made in the present invention.

It is also possible to provide a recording medium that records a program according to the present invention. The program recording medium may be a magnetic recording medium, a magnetic optical recording medium, and any other recording media to be developed in the future. The same applies to replica stages such as for primary or secondary replicas. When the present invention is embodied partly by software and partly by hardware, the concept of the invention remains completely the same. Part of the program may be stored in a recording medium and may be appropriately read out as needed. All the functions need not always be implemented by a single program and may be implemented by multiple programs. In this case, each function may be implemented on multiple computers.

BRIEF DESCRIPTION OF THE DRAWINGS

FIG. 3 diagramatically illustrates major components of a virtual force;

FIG. 10 shows a spectral Neugebauer model;

FIG. 11 shows a cellular Yule-Nielsen spectral Neugebauer model;

DETAILED DESCRIPTION OF THE PREFERRED EMBODIMENTS

Embodiments of the present invention will be described in the following sequence.

Figure 1:
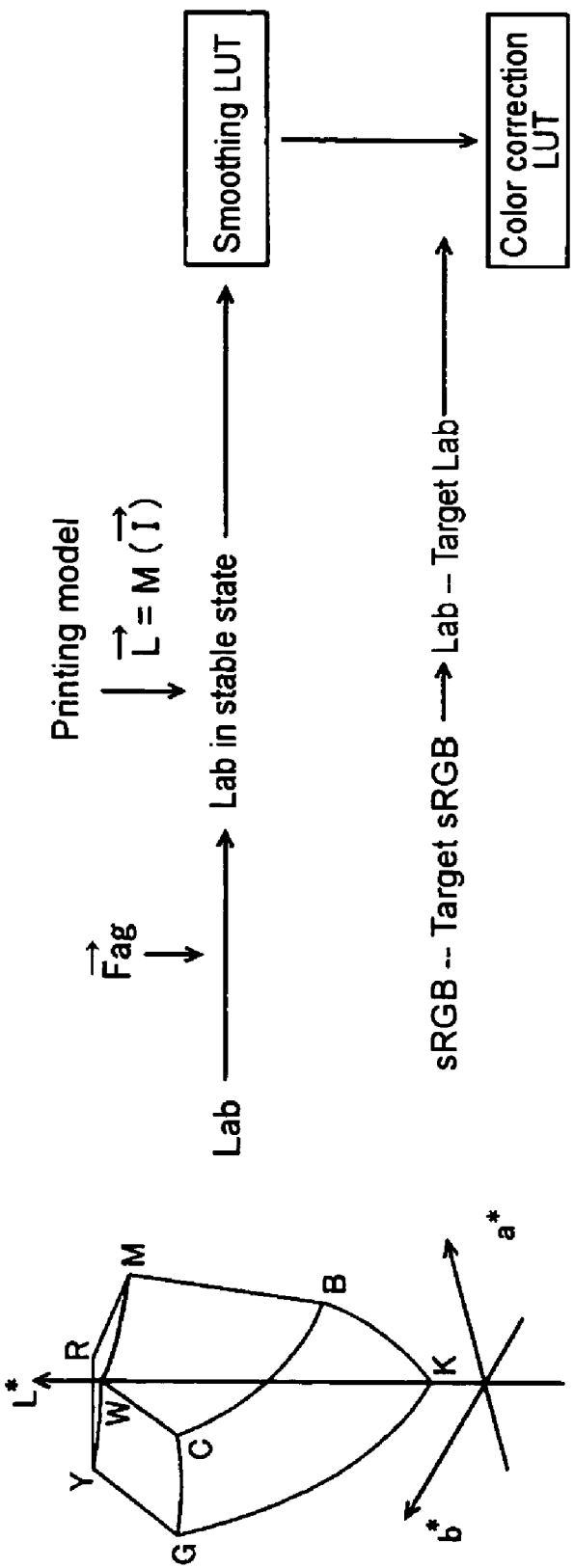
FIG. 1 schematically illustrates steps of creating a color correction LUT.

(1) Overview of color correction LUT creation and smoothing
(2) Color correction LUT creation apparatus and print control apparatus
(3) Smoothing process
(3-1) Smoothing process principle
(3-2) Introducing a constraint condition
(3-3) Flow of the smoothing process
(4) Printing model
(5) Other embodiments (1) Overview of Color Correction LUT Creation and Smoothing FIG. 1 schematically illustrates steps of creating a color correction LUT referenced when a printer performs printing. It is desirable to use a computer because many of these steps require calculations. The color correction LUT according to the embodiment defines the correspondence between sRGB and CMYKlclm data with respect to multiple reference points. It is possible to convert any sRGB data into CMYKlclm data by referencing these reference points and performing the interpolation. To create this color correction LUT, the embodiment uses a printing model (equivalent to the above-mentioned transform model to be described later in detail) for simulating a spectral distribution during printing to perform the smoothing process.

The smoothing process smoothes the arrangement of multiple lattice points in the L*a*b* space (device-independent space; asterisks will be hereafter omitted for simplicity). Generally, the interpolation is used to convert image data in different color spaces. However, an accurate interpolation is unavailable by referencing lattice points not orderly arranged in the color space. Let us suppose that table data defines correspondence between lattice points in a first color space and those in a second color space. Lattice points arranged in the first color space form a less symmetric solid. The lattice points are disorderly arranged. These lattice points adjacent to each other are connected using straight lines whose directions or lengths may vary disorderly. In such case, data in the first color space cannot be accurately converted into data in the second color space. Throughout this specification, the state of disorderly arranged lattice points is considered to be low smoothness of the lattice point arrangement.

In this manner, the low smoothness of the lattice point arrangement decreases the interpolation accuracy. The low interpolation accuracy cannot highly precisely define the correspondence between sRGB and CMYKlclm data to be defined in the final color correction LUT, degrading the color transform accuracy during printing. When the smoothness of lattice point arrangement is uneven as a whole, the color space contains different interpolation accuracies. When a color correction LUT is created for printing under this situation unchanged, an image with the gradation of continuously varying colors cannot be printed with smoothly varying colors to disable high quality printing.

To create a profile to obtain CMYKlclm data by accurately interpolating Lab data, it is necessary to increase the smoothness of the lattice point arrangement with respect to Lab lattice points to be defined in this profile. In the embodiment, this profile is referred to as a smoothing LUT.

Generally, a printer's color gamut formed in the Lab space is distorted as shown on the left of FIG. 1. In order to obtain the lattice point arrangement smoothed in such color gamut, the present invention introduces a virtual force (vector $Fa_g$) acting on each lattice point in the Lab space and simulates movement of lattice points with the virtual force applied to each lattice point. The simulation is repeated until lattice point speeds become sufficiently low (stable state). According to the present invention, the virtual force is chiefly composed of forces in proportion to distances to adjacent lattice points. The stable state signifies a state in which many lattice points almost stop with the virtual force applied.

Accordingly, lattice points in the stable state are very orderly arranged in relation to adjacent lattice points. The smoothness is very high. In consideration for this, the above-mentioned printing model is used to calculate CMYKlclm data corresponding to lattice positions in the stable state. When CMYKlclm data is supplied, the printing model is a simulation model to obtain Lab values for a print result printed with the CMYKlclm data. That is, the printing model is calculated by using its function represented as M, an independent variable represented as ink quantity vector I composed of CMYKlclm data, and a dependent variable represented as vector L composed of a Lab value.

Therefore, obtaining a Lab value in the stable state does not immediately yield the corresponding CMYKlclm data. The embodiment uses an optimization process (to be described) to calculate CMYKlclm data corresponding to the stable Lab value. In any case, making the stable Lab value and CMYKlclm data correspond to each other yields a smoothing LUT.

As mentioned above, the color correction LUT provides data that defines the correspondence between sRGB and CMYKlclm data. The smoothing LUT can be used to obtain CMYKlclm data from Lab data. The color correction LUT can be created by specifying its sRGB data.

It is a good practice to predetermine sRGB data as a reference point to be registered to the color correction LUT (this sRGB data is referred to as a target in this embodiment). Since a known equation can be used to find a Lab value corresponding to sRGB data, a Lab value corresponding to that target can be easily found. When the above-mentioned smoothing LUT is referenced using this Lab value as a target Lab value, it is possible to calculate CMYKlclm data corresponding to that target Lab value. Consequently, the color correction LUT can be obtained by making the CMYKlclm data and the above-mentioned target sRGB data correspond to each other.

In this embodiment, gamut mapping may be performed before calculating CMYKlclm data from the target Lab value by referencing the smoothing LUT. There is a difference in sizes between the color gamut for colors representable by sRGB data and the color gamut for colors representable by the Lab data defined in the smoothing LUT. These color gamuts need to be mapped so that they match. Of course, it may be preferable to provide various corrections other than the gamut mapping. For example, colors may be corrected so as to approximate to memory colors of the human being. This is because the human memory colors differ from actual colors in such a manner that the human being tends to memorize colors of the sky or skin more brilliantly than actual colors.

(2) Color Correction LUT Creation Apparatus and Print Control Apparatus

Figure 2:
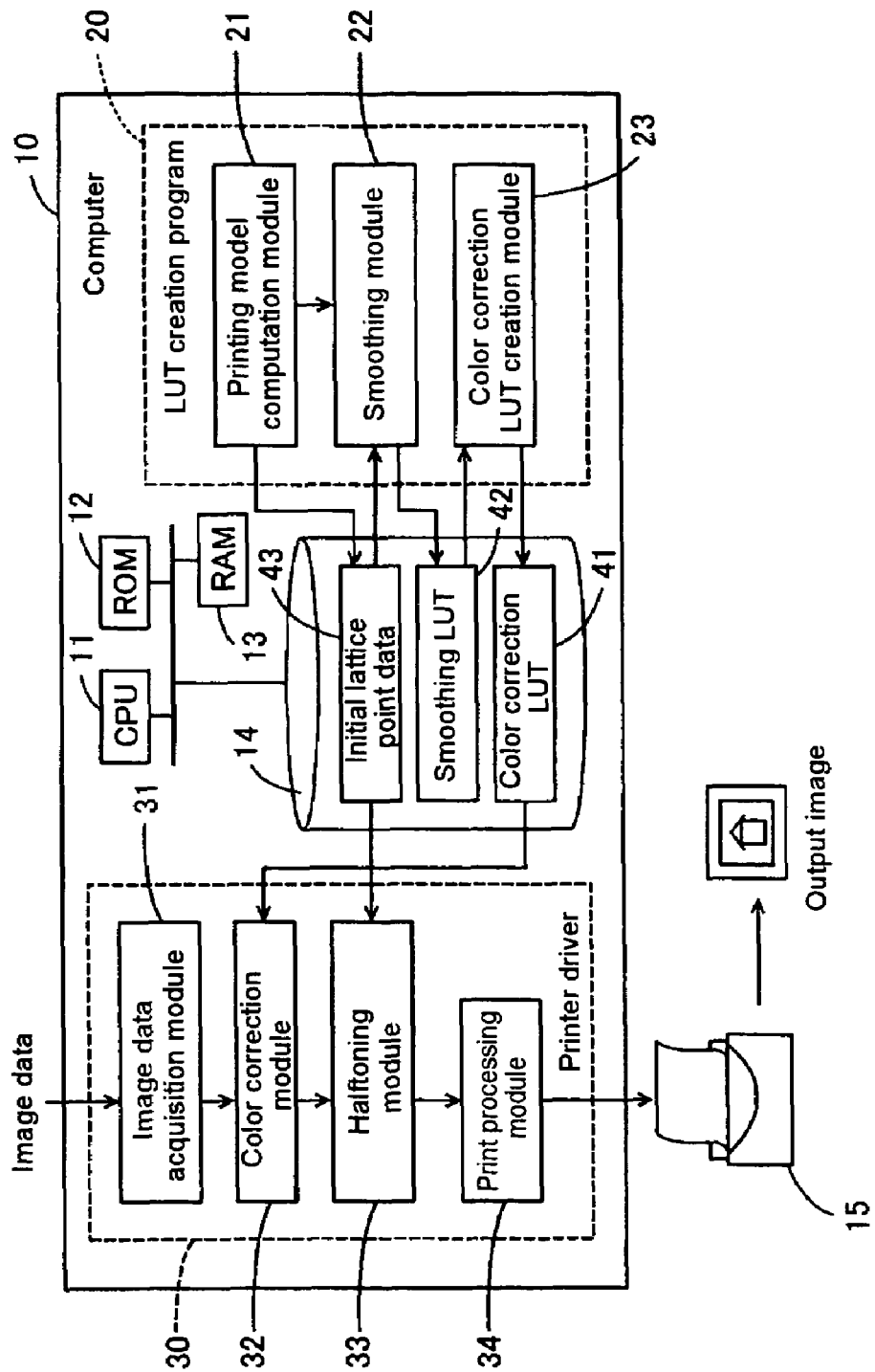
FIG. 2 is a block diagram showing the configuration of hardware and software.

The following describes configurations of an apparatus to create a profile based on the smoothing process according to the present invention and create the color correction LUT from the profile and a print control apparatus to perform printing by using the color correction LUT. FIG. 2 is a block diagram showing the configuration of hardware and software. The apparatus according to the embodiment is composed of a general-purpose computer. Of course, individual computers may be used for creation of the profile and the color correction LUT and for print control.

A computer 10 has a CPU 11 as the core of operational processes. The CPU 11 controls the computer 10 as a whole via a system bus. The system bus connects with ROM 12, RAM 13, and a hard disk 14 as well as a USB I/F, a CRT I/F, an input device I/F, and the like, though not shown.

The hard disk 14 stores the software such as an operating system (OS), an LUT creation program 20 to create the color correction LUT, a printer driver (PRTDRV) 30 to print images, and the like. The CPU 11 transfers the software, when executed, to the RAM 13. The CPU 11 executes the various programs under control of the OS by appropriately accessing the RAM 13 as a temporary work area.

The input device I/F connects to a keyboard and a mouse (not shown) as manual input devices. The CRT I/F connects to a display for monitoring. Accordingly, the computer can accept operational contents by means of the keyboard or the mouse and display various information on the display. The USB I/F connects to a printer 15 that can print images based on data output from the computer 10. Of course, the connection I/F for the printer 15 need not be limited to the USB I/F. Available connection interfaces include various connection forms such as parallel I/F, serial I/F, and SCSI as well as any connection forms to be developed in the future.

The following describes processes of the computer 10 to function as the print control apparatus according to the present invention. The computer 10 obtains image data used for various imaging devices including image input devices such as scanners, digital still cameras, and video cameras and image output devices such as displays and projectors. The computer 10 references the color correction LUT, converts colors, and works the printer 15 for printing. That is, the computer 10 references the color correction LUT to convert colors when the same image is handled on different imaging devices such as an image input device and an image output device and when image data used for respective imaging devices is used to represent respective pixel colors in different color spaces.

In order to perform printing using the color correction LUT, the computer 10 according to the embodiment has a printer driver 30 to process data during printing as shown in FIG. 2. The printer driver 30 has an image data acquisition module 31, a color correction module 32, halftoning module 33, and a print processing module 34. The image data acquisition module 31 acquires image data representing an image to be printed. When the number of pixels for the acquired image data differs from the number of pixels needed for printing, the image data acquisition module 31 converts resolutions to conform both with each other. The color correction module 32 references the color correction LUT 41 saved in the hard disk 14 and performs the interpolation to convert color coordinate systems for the image data. The color correction module 32 obtains image data from the image data acquisition module 31 to convert color coordinate systems.

When the color correction module 32 converts colors to generate CMYKlclm data, the CMYKlclm data is passed to the halftoning module 33. The halftoning module 33 performs a halftoning process. The halftoning process converts CMYKlclm tone values for dots to obtain halftone data that specifies the presence or absence of ink droplet recording for each pixel or the amount of ink droplets to be recorded for each pixel.

The print processing module 34 receives such halftone data and sorts it in the order used on the printer 15. The printer is mounted with an injection nozzle array (not shown) as an ink injection device. The nozzle array is parallel provided with multiple injection nozzles in the vertical scanning direction. Data for several dots apart from each other are simultaneously used in the vertical scanning direction. For this reason, the sort process is performed to sort data so that the printer 15 simultaneously buffers data to be simultaneously used out of the data arranged in the vertical scanning direction. After the sort process, the print processing module 34 adds specified information such as an image resolution to generate print data and outputs it to the printer 15. Based on the print data, the printer 15 prints the image corresponding to the image data to produce an output image.

According to the embodiment, the computer 10 as the print control apparatus contains the LUT creation program 20. The LUT creation program 20 creates a color correction LUT 41 before printing. The LUT creation program 20 includes a printing model computation module 21, a smoothing module 22, and a color correction LUT creation module 23. The LUT creation program 20 creates the color correction LUT 41. For this purpose, the printing model computation module 21 converts multiple CMYKlclm data into Lab data according to a model (to be described) and records the data as initial lattice point data 43 on the hard disk 14. It just needs to be able to use a predetermined number of lattice points in the Lab space as initial lattice points. Each lattice point is previously assigned a code for identification. The code is used to specify a color gamut boundary or a lattice point to be constrained to a specific position.

The smoothing module 22 applies the smoothing process to lattice points defined in the initial lattice point data 43 to create a smoothing LUT 42 and records it on the hard disk 14. When the smoothing LUT 42 is created, the color correction LUT creation module 23 creates the color correction LUT 41 based on the smoothing LUT 42. That is, a target Lab value is calculated from the predetermined target sRGB value. The smoothing LUT 42 is referenced and the interpolation is performed to convert the target Lab value into CMYKlclm data. The obtained CMYKlclm data is made correspond to the target sRGB value to create the color correction LUT 41 that is then recorded on the hard disk 14.

(3) Smoothing Process (3-1) Smoothing Process Principle

The following describes the above-mentioned smoothing process in detail. The present invention introduces a virtual force applied to each lattice point. The virtual force will be described first. The embodiment assumes that the virtual force is applied to each of many lattice points and depends on a distance and a direction with reference to an adjacent lattice point. The virtual force allows a lattice point to move. The simulation is repeated until the force balances to approximately stop moving the lattice point. In a stable state where the lattice point stops moving, the lattice point is positioned so that the virtual force approximately balances at all the lattice points. Since the positions are smoothed, it is possible to determine the lattice positions capable of implementing very highly precise interpolation.

The virtual force just needs to be determined so that the virtual force approximately balances to approximately stop the lattice point and smooth the stop position. According to the embodiment, the virtual force is mainly composed of the attraction determined by the direction and the distance against an adjacent lattice point. Equation (1) to follow defines the force to be introduced.

[Equation 1]

$$\vec{F_g} = k_p \sum_{n=1}^{N} \left( \vec{X_{gn}} - \vec{X_g} \right) \quad (1)$$

In this equation, vector X denotes the lattice point position, g the focused lattice point, and $g_n$ the adjacent lattice point. Numeral n indicates the adjacent lattice point. Maximum value N for n depends on the position of the focused lattice point. $k_p$ is the positive integer. It is assumed that the focused lattice point and one adjacent lattice point attract each other with a force along a straight line connecting both. The magnitude of this force is defined so as to be proportional to the distance therebetween.

FIG. 3 diagramatically illustrates major components of the virtual force. In FIG. 3, black and white dots represent lattice points in the Lab space. For simplicity, FIG. 3 illustrates a case where two lattice points (adjacent lattice points g1 and g2) are adjacent to a given lattice point (focused lattice point g). The force formulated by equation (1) is similar to a force that causes spring vibration in the natural world. The virtual force according to the embodiment may be modeled to this vibration. Therefore, the embodiment applies such vibration for simulation until the lattice points reach the stable state.

The embodiment defines the virtual force based on the relationship between a focused lattice point and its adjacent lattice point. When each lattice point is focused in the Lab space, the corresponding adjacent lattice point needs to be defined. Since the above-mentioned code corresponds to an initial position of each lattice point, the code may be used to previously define the adjacent relationship. Lattice points in the Lab space form finite a region and a specifically shaped color gamut. At the color gamut boundary, lattice points are defined based on the definition different from that for the color gamut inside. For example, FIG. 4 diagramatically illustrates a color gamut example formed in the Lab space. The embodiment provides different definitions about adjacent lattice points depending on positions.

Figure 4:
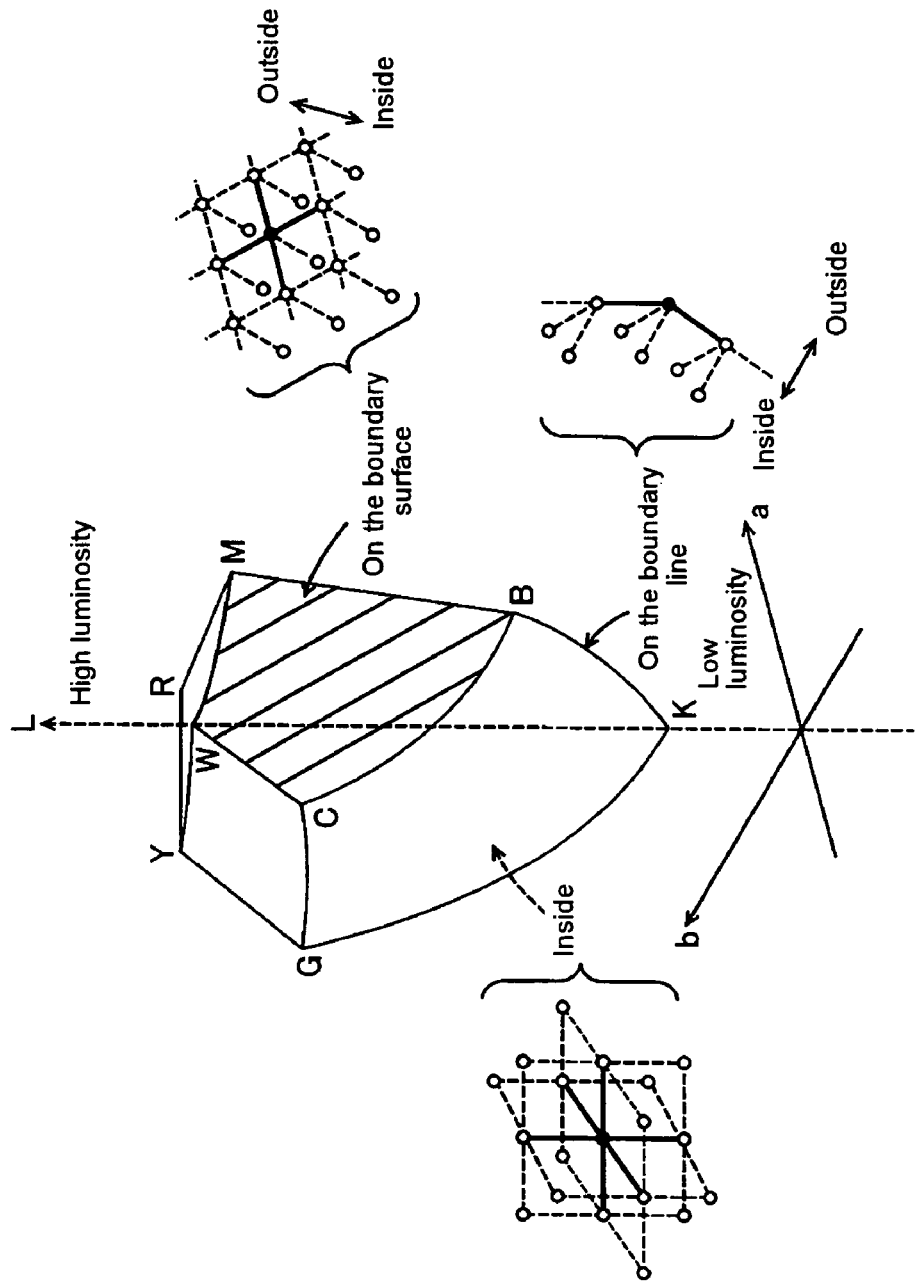
FIG. 4 shows a color gamut.

That is, different lattice point definitions are used for the boundary line, the boundary surface, and the inside of the color gamut. In FIG. 4, lattice points are selected from the boundary line, the boundary surface, and the inside of the color gamut. A black dot represents a focused lattice point. A white dot represents lattice points around the focused one. A thick line is used to connect the focused lattice point with the adjacent lattice point. Inside the color gamut, there are six adjacent lattice points with reference to the focused lattice point.

On the color gamut's boundary line, lattice points along the color gamut's boundary line and those inside the color gamut approximate to the focused lattice point. As shown in FIG. 4, however, only lattice points adjacent to each other in two directions on the color gamut's boundary line are defined to be adjacent lattice points. On the color gamut's boundary surface, lattice points positioned on the color gamut's boundary surface and those inside the color gamut approximate to the focused lattice point. As shown in FIG. 4, however, only lattice points adjacent to each other in four directions on the color gamut's boundary surface are defined to be adjacent lattice points.

When a vibration is applied to the lattice point with the force as formulated in equation (1) above, the lattice position moves so as to be smoothed as the time lapse. However, only this force does not stop the vibration. To stop the vibration, the embodiment introduces a resistive force as shown in equation (2) below.

[Equation 2]

$$\vec{Fp_g} = \vec{F_g} - k_v \vec{V_g} \quad (2)$$

In this equation, vector $Fp_g$ denotes the resultant force of virtual forces described so far. Vector V denotes the lattice point speed and g denotes the focused lattice point. $k_v$ just needs to be a positive integer. According to the above-mentioned equation, the focused lattice point is proportional to the speed magnitude and is subject to a resultant force reverse to the speed. The resultant force is equivalent to that applied to a mass point that moves in the natural world. Accordingly, the above-mentioned vibration weakens as the time elapses. The lattice point position results in the stable state.

Lattice point movements can be described by introducing the above-mentioned virtual force and assuming dynamic equations (any mass given) for the lattice points. Further, it is desirable that the virtual force be introduced in the embodiment so that fixing (or almost fixing) a lattice point other than color gamut's vertexes does not cause the fixed lattice point to be an inflection point and smoothes the lattice point arrangement. When only the force according to equation (2) above is introduced to fix an appropriate lattice point, the fixed lattice point may become an inflection point.

To solve this problem, another virtual force is introduced so that lattice points sandwiching a fixed point can result in the stable state without having an inflection point at the fixed point. It just needs to apply a virtual force so as to be able to reach the stable state without having an inflection point at the fixed point. Further, the stable state according to the embodiment is defined so that as small a resultant force as possible may be obtained from virtual forces applied to all lattice points.

Figure 5:
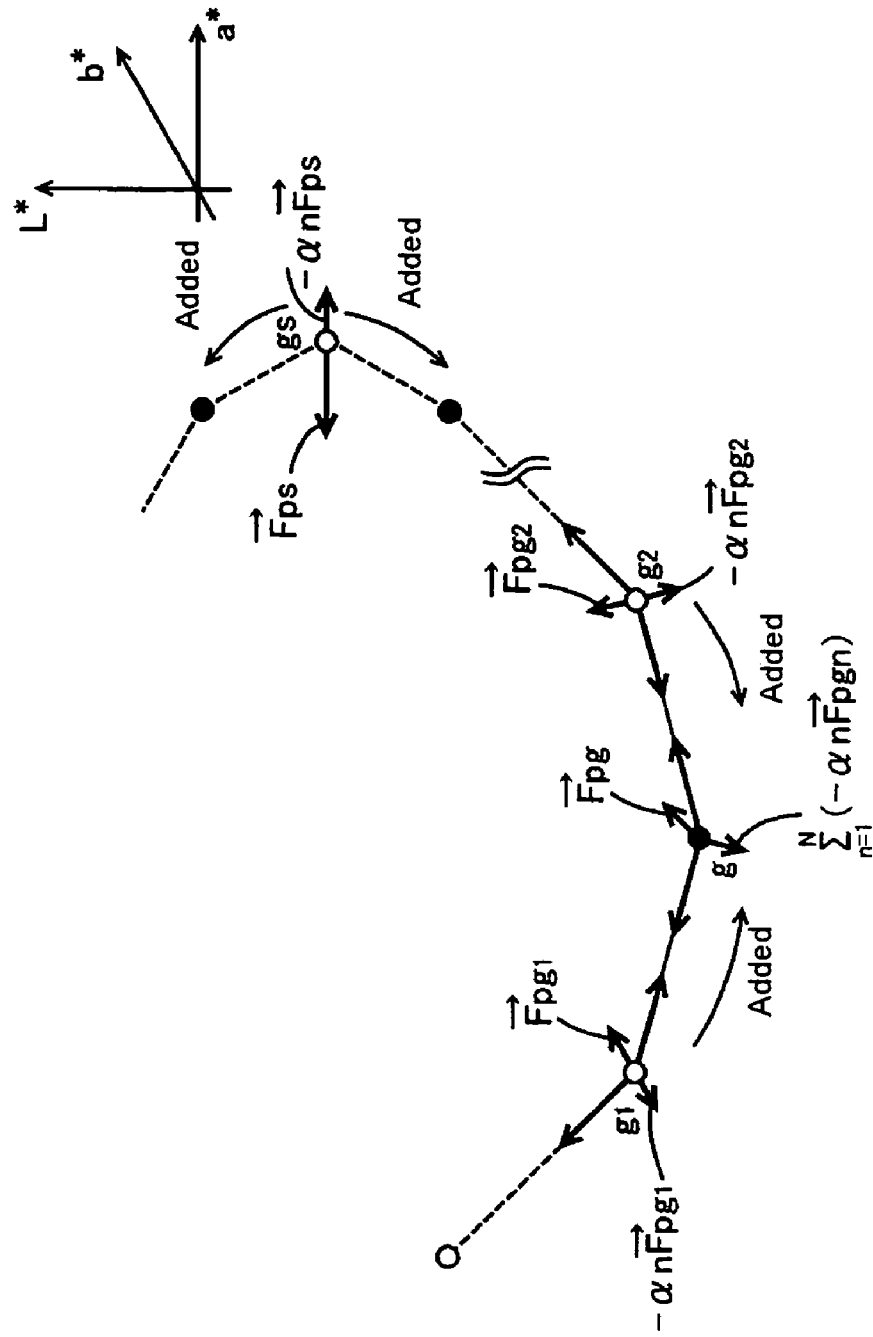
FIG. 5 diagramatically illustrates forces applied to focused lattice points.

Specifically, equation (2) above is used to calculate the virtual force acting on a given lattice point. Part of the virtual force is reversely applied to an adjacent lattice point. FIG. 5 diagramatically illustrates this force. FIG. 5 shows focused lattice point g and lattice points g1 and g2 similarly to the lattice point arrangement in FIG. 3. Let us suppose that the force found by equation (2) above acts on each of adjacent lattice points g1 and g2. Then, vectors $\vec{Fp}_{g1}$ and $\vec{Fp}_{g2}$ as shown in FIG. 5 act on the adjacent lattice points g1 and g2.

At this time, let us suppose that a reverse force results from multiplying each of vectors $\vec{Fp}_{g1}$ and $\vec{Fp}_{g2}$ by coefficient $\alpha_n$ and that the resultant force of these forces acts on focused lattice point $g_n$. That is, vector $\vec{Fa}_g$ shown in equation (3) below defines the resultant force acting on each focused lattice point $g_n$.

[Equation 3]

$$\vec{Fa}_g = \vec{Fp}_g + \sum_{n=1}^{N} \left( -\alpha_n \vec{Fp}_{gn} \right) \quad (3)$$

In this equation, vector $\vec{Fp}_g$ is the force defined by equation (2) above with respect to focused lattice point g. Vector $\vec{Fp}_{gn}$ is the force defined by equation (2) above with respect to adjacent lattice point $g_n$. Numeral n indicates the adjacent lattice point. Maximum value N for n depends on the position of the focused lattice point. Coefficient $\alpha_n$ ranges between 0 and 1 and preferably depends on an adjacent lattice point so as to provide an appropriate resultant force vector according to the number of adjacent lattice points. For example, coefficient $\alpha_n$ can be 1/N.

As mentioned above, a force is taken from part of the resultant force of virtual forces acting on adjacent lattice points and is added as the force acting on the focused lattice point. This can provide an effect of decreasing resultant forces of virtual forces acting on all the lattice points. The stable state can be maintained without allowing the fixed point to act as an inflection point. For example, as shown in FIG. 5, it is possible to achieve the stable state represented by a smooth curve that connects lattice points to each other. The force formulated by equation (3) does not act only on the fixed lattice point. All lattice points are applied with (part of) resultant forces from the corresponding adjacent lattice points. In this manner, the smooth stable state can be appropriately formed even when there is not only an intended fixed lattice point, but also an unintended but consequentially almost fixed lattice point.

Let us suppose to fix a given lattice point according to the embodiment. A resultant force of forces applied to the fixed lattice point does not become almost 0 even when the entire system reaches the stable state. However, the use of the force formulated by equation (3) dissipates part of the force acting on the fixed lattice point to the corresponding adjacent lattice point. The force is adversely dissipated to the fixed point from the adjacent lattice point. It is possible to decrease the entire system's resultant forces and almost zero the resultant force acting on the fixed point. For example, FIG. 5 shows a lattice point to be fixed as lattice point $g_s$. When only the force formulated by equation (2) is applied to the lattice point, a "polygonal line" will be formed by using lattice point $g_s$ as the inflection point.

However, let us suppose to dissipate part of a force reverse to the force (vector $\vec{Fp}_s$) acting on lattice point $g_s$ and add that reverse force to adjacent lattice points. The force acts on the adjacent lattice points so as to form an obtuse angle between two lines connecting lattice point $g_s$ with the adjacent lattice points. The stable state results as a smooth curve without forming the "polygonal line" using lattice point $g_s$ as an inflection point. Part of the force (that formulated by equation (2)) acting on lattice points adjacent to lattice point $g_s$ is added to lattice point $g_s$. A resultant force from this force and vector $\vec{Fp}_s$ approximates to 0. Even when a fixed point is provided according to equation (3) above, it is possible to ensure the stable state, i.e., a state of applying a small energy to the entire system without placing excessive restrictions on the lattice point arrangement.

As mentioned above, a dynamic equation is taken into consideration by assuming that the virtual force formulated by equation (3) acts on a focused lattice point. The lattice point arrangement can be smoothed by changing lattice points to the stable state based on the dynamic equation. Specifically, equation (4) below is used as the dynamic equation for the focused lattice point.

[Equation 4]

$$\vec{A}_g^t = \vec{Fa}_g^t \quad (4)$$

Here, vector $\vec{A}_g^t$ is the acceleration for lattice point g at time t.

When the acceleration at time t is given, equation (5) can be used to express the speed for lattice point g after the lapse of infinitesimally small time interval dt.

[Equation 5]

$$\vec{V}_g^{t+dt} = \vec{A}_g^t dt + \vec{V}_g^t \quad (5)$$

Here, vector $\vec{V}_g^t$ is the speed for lattice point g at time t. The acceleration for each lattice point may be 0 or may be given an appropriate initial speed.

When the speed at time t is given, equation (6) can be used to express the position of lattice point g after the lapse of infinitesimally small time interval dt.

[Equation 6]

$$\vec{X}_g^{t+dt} = \vec{V}_g^{t+dt} dt + \vec{X}_g^t \quad (6)$$

Here, vector $\vec{X}_g^t$ is the position of lattice point g at time t.

When the above-mentioned equation (3) is used to specify the virtual force, it is possible to specify the speed and the position after the lapse of the infinitesimally small time interval based on equations (4) through (6). Accordingly, the embodiment repeats a process of passing through the infinitesimally small time interval until speeds of all the lattice points reach almost 0 (e.g., a specified threshold value or less). This state can be determined to be the stable state. By introducing the simulation using the virtual force, it is possible to move all the lattice points at a time for the simulation.

On the other hand, it is possible to suppose a process that introduces an evaluation function to evaluate the smoothness of the focused lattice point s arrangement based on the relative positional relationship between the focused lattice point and an adjacent lattice point. The process improves the evaluation in the evaluation function to optimize the focused lattice position. However, when such process is sequentially performed for each of lattice points, some lattice positions are optimized and the others are not. During the optimization, an error in moving one lattice point may be accumulated. The other lattice position may not be optimized When an attempt is made to introduce an evaluation function that evaluates the arrangement smoothness with respect to all the lattice points, the number of dimensions becomes enormous. An optimization process is impracticable. On the other hand, the present invention introduces the above-mentioned virtual force to calculate a speed and a position at each lapse of the infinitesimally small time interval. The movements of all the lattice points can be easily simulated. Accordingly, the simulation is available by simultaneously moving all the lattice points as mentioned above. The simulation is free from accumulating local errors.

(3-2) Introducing a Constraint Condition

The above-mentioned process can smooth the arrangement of lattice points in the Lab space. The embodiment creates the above-mentioned smoothing LUT 42 by defining the correspondence between Lab data and CMYKlclm data. Lab data defined in the smoothing LUT 42 needs to be suitable as a color transform table. For this reason, the embodiment further introduces a constraint condition to correct lattice positions when the above-mentioned equations (4) through (6) perform the movement at each infinitesimally small time interval.

Various conditions can be introduced as constraint conditions. For example, the above-mentioned printing model may be used to convert any CMYKlclm data to obtain Lab data that then defines a color gamut. Conditions to be constrained within this color gamut can be used. The lattice positions may be corrected so as to match the Lab data resulting from converting the CMYKlclm data through the use of the printing model. In this manner, each lattice point can be constrained within the color gamut. More specifically, optimizing equation (7) below can constrain Lab data within the color gamut.

[Equation 7]

$$E = |\vec{L} - \vec{L_t}|^2$$

$$\vec{L} = M(\vec{I}) \quad (7)$$

Here, E is the objective function for the optimization process and vector $L_t$ denotes the focused lattice position at time t. Vector L is composed of a Lab value resulting from assigning the CMYKlclm data to the printing model. Vector L is a result of assigning ink quantity vector I composed of the CMYKlclm value to function M indicative of the operation by means of the printing model. The optimization process minimizes the objective function E by moving the CMYKlclm data. As a result, this process calculates vector L having the Lab value that becomes a minimum color difference with reference to the focused lattice position at time t. Accordingly, the correction is made so that the focused lattice position corresponds to vector L. The available optimization processes include known algorithms such as the quasi Newton method and the conjugate gradient method.

The optimization process can be applied to all lattice points in the Lab space. When the optimization process according to equation (7) is performed for lattice points corresponding to the color gamut boundary, the focused lattice points are constrained in the color gamut. At the same time, it is possible to obtain the optimized Lab data and the CMYKlclm data corresponding to that Lab data. When the optimization process according to equation (7) is performed for an equivalent lattice point in the color gamut, the lattice point has a little significance as to the constraint condition for constraint in the color gamut since that lattice point originally belongs to the inside of the color gamut. However, the process result in acquisition of the CMYKlclm data corresponding to the Lab data indicative of the lattice point at time t.

Further, the above-mentioned color gamut can be more stringent so that the Lab data defined in the smoothing LUT 42 is appropriate for the color transform table. For example, it is possible to employ a condition to constrain lattice points existing at the boundary of the color gamut as far as possible toward the color gamut's outline. More specifically, equation (8) below can be employed as the objective function.

[Equation 8]

$$E = w_l(L - L_t)^2 + w_h(H - H_t)^2 + \frac{1}{C} \quad (8)$$

Here, E is the objective function for the optimization process and $L_t$ and $H_t$ are the luminosity and the hue respectively obtained from a focused lattice position at time t. L, H, and C respectively denote the luminosity, the hue, and the chroma corresponding to Lab values resulting from assigning the CMYKlclm data to the printing model. Coefficients $w_l$ and $w_h$ are used to maintain the luminosity and the hue.

To make objective function E in equation (8) as small as possible, the first and second terms result in 0 when the luminosity and the hue are maintained as far as coefficients $w_l$ and $w_h$ are not 0. That is, the luminosity and the hue are maintained. Accordingly, the optimization process using this objective function maintains the luminosity and the hue for the focused lattice position at time t and calculates vector L so as to provide as large the chroma as possible.

The above-mentioned coefficients $w_l$ and $w_h$ may be predetermined constants. According to the embodiment, however, these coefficients are time-dependent. This is because excessive constraint needs to be avoided and the smoothing LUT 42 finally defines Lab data preferable to the color transform table. When the infinitesimally small time interval elapses as mentioned above, coefficients $w_l$ and $w_h$ are configured to increase as the time lapse.

Figure 6:
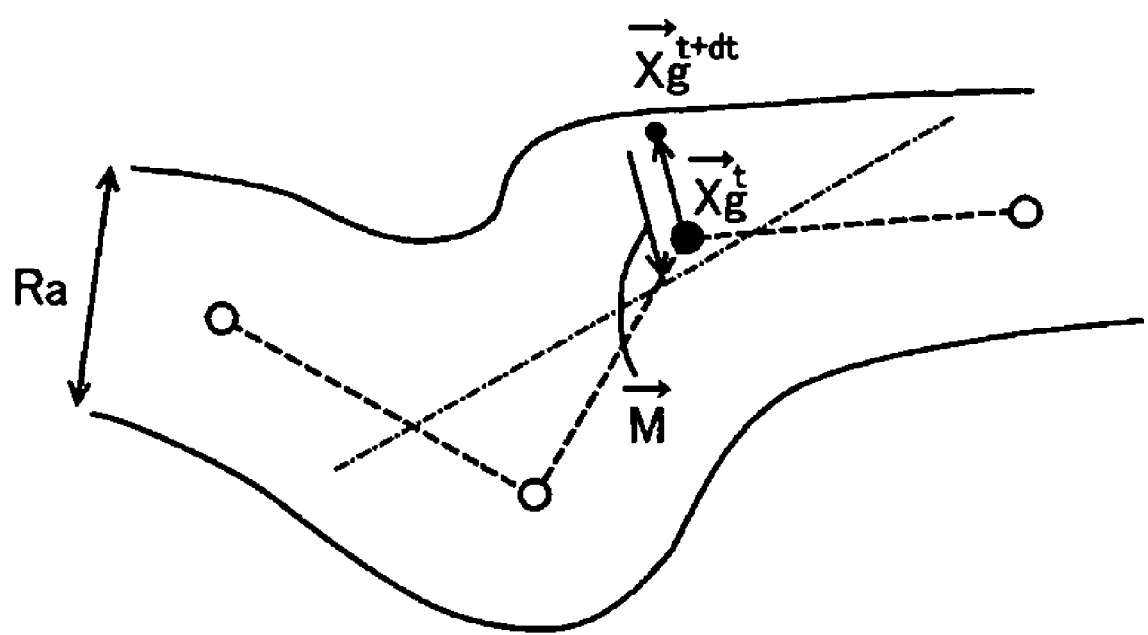
FIG. 6 diagramatically illustrates a time-dependent constraint condition.

FIG. 6 diagramatically illustrates an effect of introducing the time-dependent constraint condition. The constraint condition as formulated by equation (8) provides correction to constrain a focused lattice point so as to approach the maximum chroma in the color gamut. In FIG. 6, for example, a black dot represents the focused lattice point and white dots represent to the other lattice points. FIG. 6 assumes that the simulation based on equations (4) through (6) moves focused lattice point g at time t from vector $X^t_g$ to vector $X^{t+dt}_g$ after the lapse of infinitesimally small time interval dt.

Introducing the constraint condition according to equation (8) is equivalent to correcting the position of focused lattice point g expressed by vector $X^{t+dt}_g$. A dash-dot line represents the color gamut outline. Vector M is equivalent to a vector for correction to the maximum chroma. It can be understood that the lapse of the infinitesimally small time interval scarcely moves lattice point g. Too stringent a constraint condition almost fixes focused lattice point g. Even when the lattice position is not fixed, introducing an excessive constraint condition makes it very difficult to move lattice points. As a result, focused lattice point g may not move toward the stable state with the passage of time.

The above-mentioned coefficients $w_l$ and $w_h$ are specified so that they are time-dependent and increase with the passage of time. As a result, the lattice positions can be freely varied within allowable range Ra at the initial stage of the simulation. Further, the lattice positions can be controlled to be constrained to intended positions at the final stage of the simulation. Various conditions can be employed for the time dependency needed for such control. For example, the coefficients may be set to 0 before a specified time lapse and may be set to specified T (positive value) after the specified time lapse. Moreover, the coefficients may be incremented as the time elapses.

In any case, coefficients $w_l$ and $w_h$ are configured to be time-dependent. Accordingly, the lattice positions can be freely varied within allowable range Ra at the initial stage of the simulation. The lattice positions can be controlled to be constrained to intended positions at the final stage of the simulation.

Furthermore, the lattice point can be constrained to a predetermined position in the Lab space. For example, equation (9) below is used to define a position to be constrained.

[Equation 9]

$$\begin{cases} a^* = g_a(L^*) \\ b^* = g_b(L^*) \end{cases} \quad (9)$$

Figure 7:
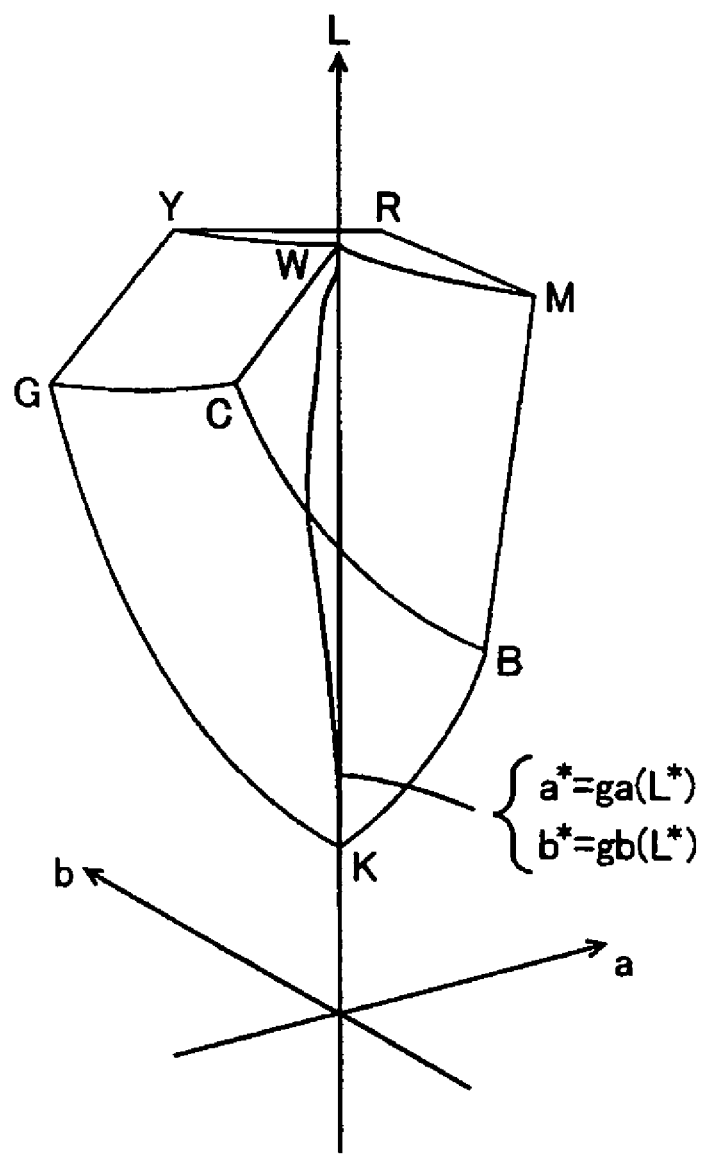
FIG. 7 diagramatically illustrates constraint on curves in the Lab space.

Here, functions $g_a$ and $g_b$ respectively indicate values a* and b* in the Lab space corresponding to luminosity L* in the Lab space. As shown in FIG. 7, the functions are equivalent to a curve in the Lab space.

Equation (10) below is used to define the objective function.

[Equation 10]

$$E = |\vec{L} - \vec{L_t}|^2 + w_m \cdot \{(a^* - g_a(L^*))^2 + (b^* - g_b(L^*))^2\} \quad (10)$$

Here, vector $L_t$ indicates the focused lattice position at time t. Vector L is a result of assigning ink quantity vector I to the printing model (function M). L*, a*, and b* in equation (10) are Lab values obtained by the printing model. Coefficient $w_m$ restrains lattice points to the curve in FIG. 7 and increases as the time elapses In equation (10), the second term increases as the Lab values obtained by the printing model depart from the curve shown in FIG. 7. When objective function E is minimized for optimization, the position after the correction can possibly approximate to the curve shown in FIG. 7. According to the above-mentioned time dependency of coefficient $w_m$, this condition becomes more stringent toward the final stage of the simulation. The Lab values after the correction can be further approximated to the curve.

When a lattice point is constrained to a given curve as mentioned above, the lattice position can be more flexibly controlled compared to the condition of merely being achromatic color (i.e., a lattice point on the L axis). There are various cases where, for example, it is preferable to provide a specified chroma for the output color as achromatic color depending on media to be used for the creation of the color correction LUT 41. Defining the above-mentioned curve can constrain lattice positions depending on various cases. Equation (10) is only an example. The constraining color is not limited to gray. The constraint condition can be applied to any colors. Moreover, various constraint conditions can be introduced. For example, a constraint condition may be added so that a color equivalent to flesh color is arranged at a specified lattice position.

(3-3) Flow of the Smoothing Process

Figure 8:
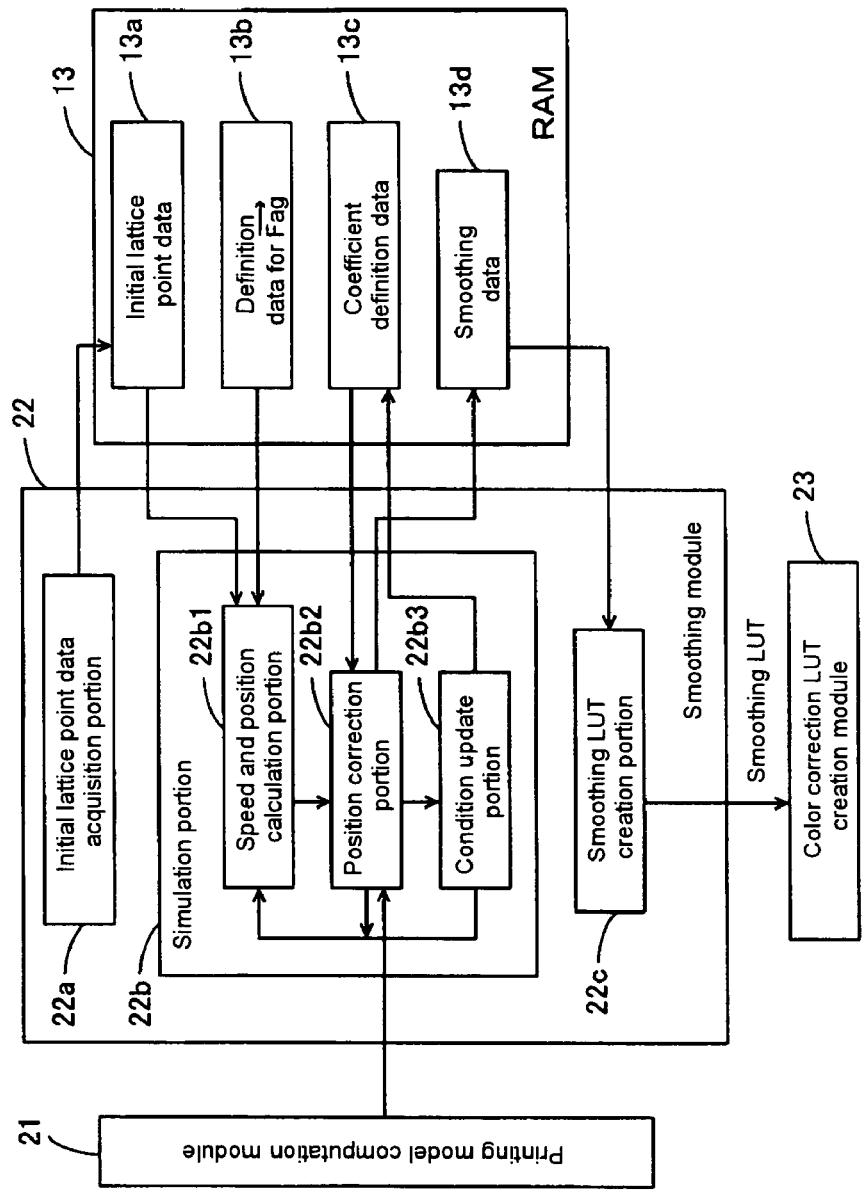
FIG. 8 is a block diagram showing the detailed configuration of a smoothing module.
Figure 9:
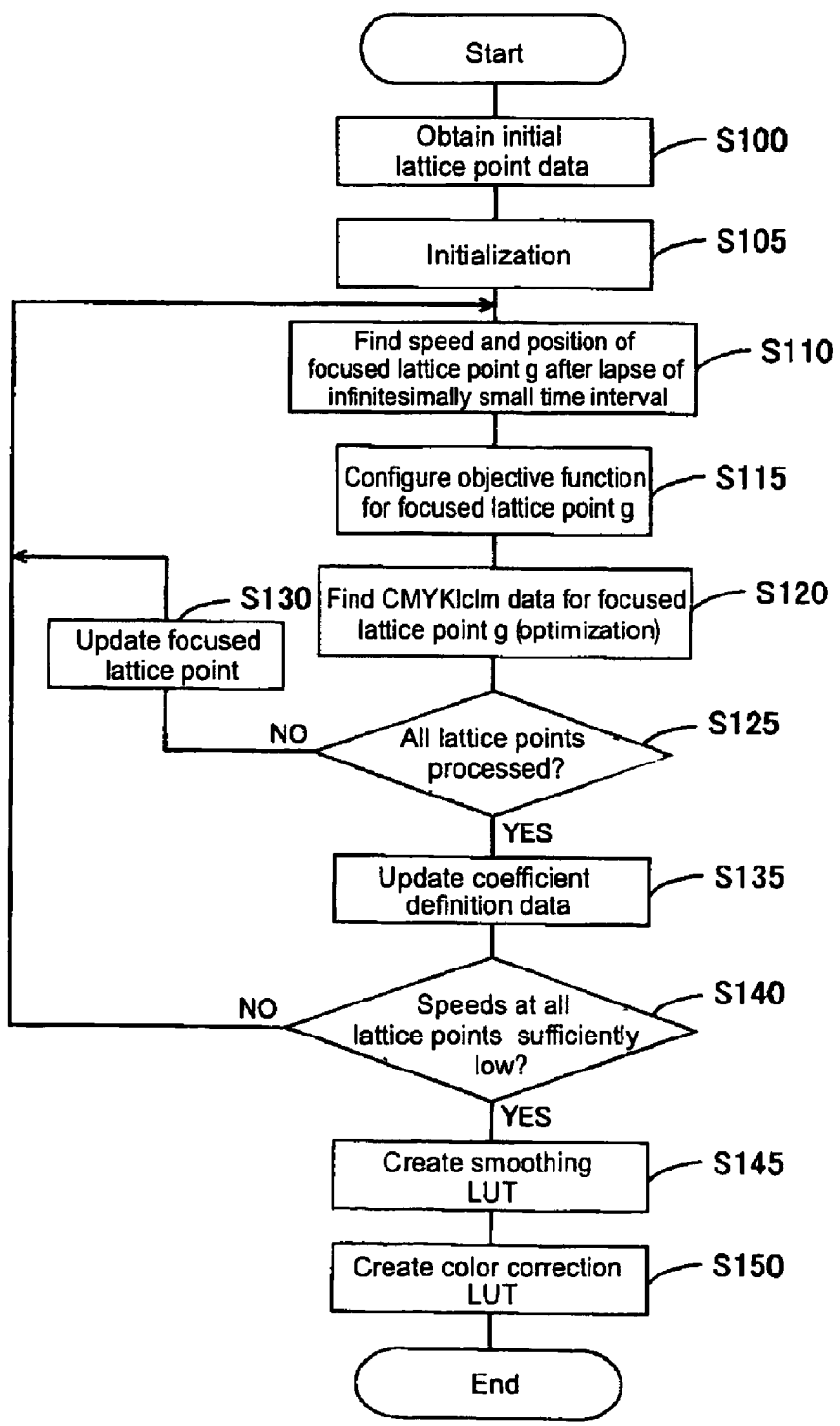
FIG. 9 is a flowchart exemplifying a process in an LUT creation portion.

According to the embodiment, equations (4) through (6) are used to describe lattice point movements. Equations (7) through (10) are used to correct the Lab value by incorporating the constraint condition as needed and to calculate CMYKlclm data corresponding to the obtained Lab value. FIG. 8 is a block diagram showing the detailed configuration of the smoothing module 22 that performs this process. FIG. 9 is a flowchart exemplifying a process in the LUT creation portion 20. The smoothing module 22 has an initial lattice point data acquisition portion 22a, a simulation portion 22b, and a smoothing LUT creation portion 22c.

At Step S100 in FIG. 9, the initial lattice point data acquisition portion 22a obtains initial lattice point data 43 from the hard disk 14 and records it on the RAM 13 (initial lattice point data 13a). The simulation portion 22b simulates the movement at the lattice point. The simulation portion 22b uses Lab data obtained by the printing model computation module 21 to correct the lattice position. For this purpose, the simulation portion 22b has a speed and position calculation portion 22b1, a position correction portion 22b2, and a condition update portion 22b3. The speed and position calculation portion 22b1 and the position correction portion 22b2 initialize information needed for the process (step S105). That is, the speed and position calculation portion 22b1 defines initial speeds for the lattice points defined in the initial lattice point data 13a. The position correction portion 22b2 references coefficient definition data 13c and determines a constraint condition needed for each lattice point.

The coefficient definition data 13c is predetermined to specify coefficients ($w_l$, $w_h$, and $w_m$) to be used for lattice points. The constraint condition is provided for each lattice point and therefore is assigned the information indicative of these coefficients and a code for identifying the lattice point. The constraint condition just needs to be predetermined. The constraint condition can be determined by means of various techniques such as determining the constraint condition according to a predetermined rule or by trial and error. Of course, the constraint condition may be configured to use equation (7) above when no lattice point is constrained to a specified position.

The coefficient definition data 13c concerns the constraint equations determined as mentioned above. At Step S105, the process determines the constraint condition equation at time lapse 0 based on that definition. After the initialization above, the speed and position calculation portion 22b1 makes a focused lattice point out of those not targeted for the subsequent process and calculates the lattice point's speed and position. For this process, the embodiment previously creates data 13b indicating the definition of vector $Fa_g$ in equation (3) and records the data in the RAM 13 for execution of the LUT creation program 20.

The speed and position calculation portion 22b1 obtains the definition data 13b. Based on the above-mentioned equations (4) through (6), the speed and position calculation portion 22b1 calculates the speed and the position of focused lattice point g after lapse of the infinitesimally small time interval (Step S110). When the process calculates the speed and the position after lapse of the infinitesimally small time interval, the position correction portion 22b2 obtains the constraint condition equation determined at Step S105 for the focused lattice point g to configure objective function E for the focused lattice point g (Step S115). The process uses objective function E to perform the optimization process (Step S120). As a result, the process corrects the position of focused lattice point g according to the constraint condition and calculates the corrected Lab data and the corresponding CMYKlclm data. The result is recorded as smoothing data 13 in the RAM 13. When data is already recorded for the same focused lattice point, the optimized data is used to update the smoothing data 13d.

The above-mentioned process is equivalent to simulating focused lattice point g after lapse of the infinitesimally small time interval. The speed and position calculation portion 22b1 determines whether or not all lattice points are subject to the process of calculating the speed and the position after lapse of the infinitesimally small time interval (Step S125). When it is not determined at Step S125 to perform the process of calculating the speed and the position after lapse of the infinitesimally small time interval, the process makes a new focused lattice point out of unprocessed lattice points (Step S130). The process is repeated at Step S110 and later.

When it is determined at Step S125 to perform the process of calculating the speed and the position after lapse of the infinitesimally small time interval, this signifies that speeds and positions after lapse of the infinitesimally small time interval are settled for all the lattice points. The condition update portion 22b3 updates a coefficient to vary with the time (Step S135). That is, the above-mentioned coefficients $w_l$, $w_h$, and $w_m$ vary with the lapse of time. The condition update portion 22b3 supplies each value with a predetermined variation to update the coefficient definition data 13c. After this process, the speed and position calculation portion 22b1 determines whether or not speeds at all the lattice points are sufficiently low (Step S140). The process is repeated at Step S110 and later until speeds at all the lattice points are determined to be sufficiently low.

When it is determined at Step S140 that speeds at all the lattice points are determined to be sufficiently low, all the lattice points are assumed to reach the stable state. The smoothing LUT creation portion 22c records the smoothing LUT 42, i.e., the correspondence between the Lab data and the CMYKlclm data, on the hard disk 14 (Step S145). The correspondence is defined in the smoothing data 13d. When the smoothing LUT 42 is created, the color correction LUT creation module 23 references the smoothing LUT 42 to create the color correction LUT 41 and records it on the hard disk 14 (Step S150). According to the embodiment, the process at Steps S105 through S140 in the simulation portion 22b is equivalent to the process in the above-mentioned stable position acquisition portion. It may be interpreted that the correspondence between the Lab data and the CMYKlclm data in the smoothing data 13d is determined based on the transform. Accordingly, the process at Step S145 in the smoothing LUT creation portion 22c is equivalent to the process in the profile creation portion.

As shown in equation (3) above, the smoothing process adds part of the virtual force acting on an adjacent lattice point to the focused lattice point. In this manner, the lattice point arrangement can be smoothed even when a fixed lattice point exists. Since it is possible to introduce various constraint conditions such as equations (7) through (10) above, the lattice point arrangement can be smoothed in consideration for various conditions. Consideration is taken of the speed and the position after the infinitesimally small time interval for all the lattice points. It is possible to simulate a state where all the lattice points move at a time. The lattice point arrangement can be smoothed with no accumulation of errors in comparison with the process that optimizes lattice points one by one (4) Printing Model The following details an example of the printing model. The printing model to be described is referred to as the cellular Yule-Nielsen spectral Neugebauer model (Cellular Yule-Nielsen Spectral Neugebauer Model). This model is based on the well-known spectral Neugebauer model and the Yule-Nielsen model. In the description to follow, the model uses three types of inks CMY. The model can be easily expanded to a model that uses any number of inks.

FIG. 10 shows a spectral Neugebauer model. The spectral Neugebauer model uses equation (11) below to give spectral reflectance R ($\lambda$) for any printout.

[Equation 11]

$$R(\lambda) = a_w R_w(\lambda) + a_c R_c(\lambda) + a_m R_m(\lambda) + a_y R_y(\lambda) + \\ a_r R_r(\lambda) + a_g R_g(\lambda) + a_b R_b(\lambda) + a_k R_k(\lambda)$$

$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m) f_y$$
$$a_r = (1 - f_c) f_m f_y$$
$$a_g = f_c(1 - f_m) f_y$$
$$a_b = f_c f_m(1 - f_y)$$
$$a_k = f_c f_m f_y$$

(11)

Here, $a_i$ is the area ratio of the ith region and Ri ($\lambda$) is the spectral reflectance of the ith region. Suffix i denotes: a no-ink region (w); a region to record only cyan ink (c); a region to record only magenta ink (m); a region to record only yellow ink (y); a region to record magenta and yellow inks (r); a region to record yellow and cyan inks (g); a region to record cyan and magenta inks (b); and a region to record three CMY inks (k). When only one of CMY inks is injected, $f_c$, $f_m$, and $f_y$ indicate the ratio (hereafter referred to as the "ink coating ratio") of area covered by that ink spectral reflectance Ri ($\lambda$) is obtained by measuring a color patch using a spectral reflectometer.

A Murray-Davis model as shown in FIG. 10(B) gives the ink coating ratios $f_c$, $f_m$, and $f_y$. According to the Murray-Davis model, for example, area ratio $f_c$ of the cyan ink is represented as a nonlinear function of the cyan ink injection quantity $d_c$. The Murray-Davis model is provided as a one-dimensional lookup table. The ink coating ratio is represented by the nonlinear function of ink injection quantities. The reason follows. When a small quantity of ink is injected to a unit area, the ink fully spreads. When a large quantity of ink is injected, the ink overlaps with each other. The area covered by the ink does not increase so much.

When the Yule-Nielsen model concerning the spectral reflectance is used, equation (11) can be rewritten to equation (12a) or (12b) below.

[Equation 12]

$$R(\lambda)^{1/n} = a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + a_g R_g(\lambda)^{1/n} + a_b R_b(\lambda)^{1/n} + \\ a_k R_k(\lambda)^{1/n}$$

(12a)

-continued $$R(\lambda) = \{a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + a_g R_g(\lambda)^{1/n} + a_b R_b(\lambda)^{1/n} + \\ a_k R_k(\lambda)^{1/n}\}^n \quad (12b)$$

Here, n is a specified coefficient greater than or equal to 1. For example, n can be set to 10. Equations (12a) and (12b) formulate the Yule-Nielsen Spectral Neugebauer Model.

A cellular Yule-Nielsen spectral Neugebauer model divides the space formed with ink coating ratios according to the Yule-Nielsen Spectral Neugebauer Model into multiple cells.

FIG. 11(A) exemplifies cell division in the cellular Yule-Nielsen spectral Neugebauer model. The example illustrates the cell division in a two-dimensional space including two axes for cyan ink coating ratio $f_c$ and magenta ink coating ratio $f_m$. The axes $f_c$ and $f_m$ can be assumed to be axes representing the ink injection quantities $d_c$ an $d_m$. A white dot indicates a grid point (referred to as a "node") for the cell division. The two-dimensional space is divided into nine cells C1 through C9. Printouts (color patches) for 16 nodes are preassigned with spectral reflectances $R_{00}$, $R_{10}$, $R_{20}$, $R_{30}$, $R_{01}$, $R_{11}$, ..., and $R_{33}$.

FIG. 11(B) shows formation of ink coating ratio $f_c(d)$ corresponding to the cell division. In this example, the quantity of one type of ink ranges from 0 to $d_{max}$. The range is divided into three portions. In each portion, the ink coating ratio $f_c(d)$ is represented by a curve that simply increases from 0 to 1.

FIG. 11(C) shows how to calculate spectral reflectance Rsmp($\lambda$) for a sample in the center cell C5 of FIG. 11(A). spectral reflectance Rsmp($\lambda$) is given by equation (13) below.

[Equation 13]

$$Rsmp(\lambda) = \left(\sum a_i R_i(\lambda)^{1/n}\right)^n \quad (13)$$
$$(a_{11} R_{11}(\lambda)^{1/n} + a_{12} R_{12}(\lambda)^{1/n} + \\ a_{21} R_{21}(\lambda)^{1/n} + a_{22} R_{22}(\lambda)^{1/n})^n$$
$$a_{11} = (1 - f_c)(1 - f_m)$$
$$a_{12} = (1 - f_c) f_m$$
$$a_{21} = f_c (1 - f_m)$$
$$a_{22} = f_c f_m$$

Here, ink coating ratios $f_c$ and $f_m$ are values that are given according to the graph in FIG. 11(B) and are defined in cell C5. spectral reflectances $R_{11}(\lambda)$, $R_{12}(\lambda)$, $R_{21}(\lambda)$, and $R_{22}(\lambda)$ corresponding to four vertexes of cell C5 are adjusted so as to correctly give sample spectral reflectance Rsmp ($\lambda$) according to equation (13) above. In this manner, dividing the space formed with ink coating ratios into multiple cells makes it possible to more accurately calculate spectral reflectance Rsmp($\lambda$) of the sample compared to a case of not dividing the space. It is preferable to individually specify node values for the cell division correspondingly to the respective ink colors.

Figure 12:
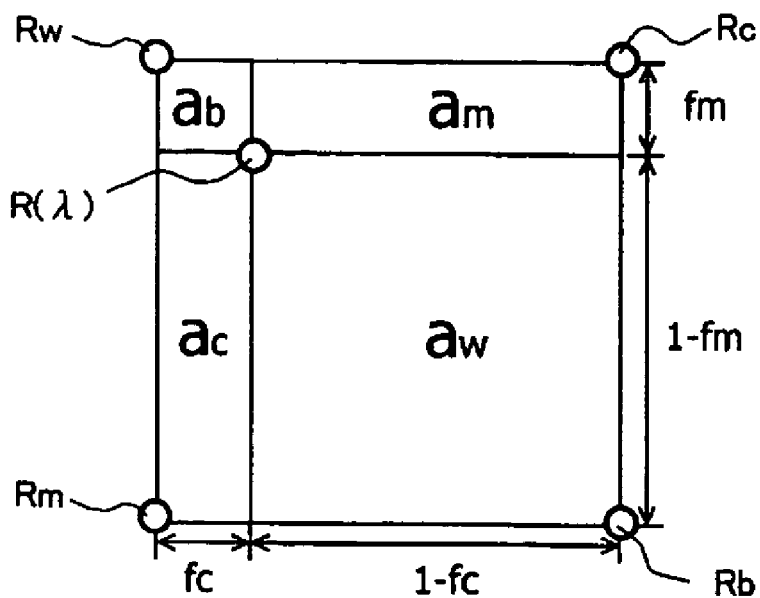
FIG. 12 diagramatically illustrates how to find an unmeasurable spectral reflectance in the cellular Yule-Nielsen spectral Neugebauer model.

Generally, according to the model in FIG. 11(A), measuring color patches cannot obtain spectral reflectances at all nodes. This is because injecting a large quantity of ink causes a blur, making it impossible to print a uniformly colored patch. FIG. 12 shows how to find an unmeasurable spectral reflectance. The example uses only two types of inks, cyan and magenta. Equation (14) below gives spectral reflectance R($\lambda$) of a given color patch printed in two types of inks, cyan and magenta.

[Equation 14]

$$R(\lambda)^{1/n} = a_w R_w(\lambda)^{1/n} + a_c R_c(\lambda)^{1/n} + a_m R_m(\lambda)^{1/n} + a_b R_b(\lambda)^{1/n} \quad (14)$$

$$a_w = (1-f_c)(1-f_m)$$
$$a_c = f_c(1-f_m)$$
$$a_m = (1-f_c)f_m$$
$$a_b = f_c f_m$$

It is assumed that, of multiple parameters contained in equation (14), an unknown parameter is only spectral reflectance Rb($\lambda$) with the cyan and magenta inks both injected 100%. The other parameter values are assumed to be known. Modifying equation (14) yields equation (15) below.

[Equation 15]

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}^n \quad (15)$$

As mentioned above, all terms on the right-hand side are known. Accordingly, solving equation (15) can calculate unknown spectral reflectance Rb($\lambda$).

It is possible to similarly find spectral reflectances of two-dimensional colors other than cyan and magenta. When reflectivities of multiple two-dimensional colors are found, reflectivities of multiple three-dimensional colors can be also found. By successively finding high-order spectral reflectances, it is possible to find all spectral reflectances at nodes in the cell-divided space formed with ink coating ratios.

The printing model computation module 21 in FIG. 1 includes: spectral reflectances at nodes in the cell-divided space formed with ink coating ratios as shown in FIG. 11(A); and the one-dimensional lookup table indicative of ink coating ratios as shown in FIG. 11(B). These are used to calculate spectral reflectance Rsmp($\lambda$) for any ink quantity data (CMYKlclm data in the above-mentioned embodiment). The printing model computation module 21 further contains data indicating a spectral reflectance and a color-matching function for a predetermined light source. A tristimulus value is calculated by adding the product of the data and the above-mentioned spectral reflectance Rsmp($\lambda$) for each wavelength. A known equation is used to convert the tristimulus value to obtain the Lab data.

(5) Other Embodiments

The above-mentioned embodiment is an example. The other various configurations can be employed as long as the lattice point arrangement can be smoothed through the simulation using the virtual force. For example, the processes according to the present invention can be applied to an apparatus that uses an ICC profile for printing. The ICC profile provides a source profile and a media profile in advance. The source profile converts color component values used for image input devices such as displays into coordinate values (Lab values and the like) in a device-independent color space. The media profile converts coordinate values in the device-independent color space into color component values used for image output devices such as printers. According to an available configuration, the source profile specifies the correspondence between the target sRGB and the target Lab in FIG. 1. The media profile specifies the correspondence between Lab and CMYKlclm data.

The above-mentioned printer 15 can mount six colors of ink CMYKlclm. Of course, the number of colors maybe increased by adding DY (dark yellow). The number of colors may be decreased by not using lclm. Further, the other colors such as R (red) and V (violet) may be used to be able to mount six colors of ink CMYKRV.

The above-mentioned virtual force is proportional to a distance between lattice points. The magnitude of force between lattice points is not limited thereto and may simply increase with reference to distances. Of course, the resistive force acting on a lattice point is not limited to be proportional to speeds and to be reverse to the speed. There may be various resistive forces that resist movements due to the virtual force acting between lattice points. Lattice points adjacent to the focused lattice point are not limited to the above-mentioned definition. Further, the color space for smoothing the lattice point arrangement just needs to be device-independent and may be an L*u*v* and an XYZ as well as the above-mentioned L*a*b* space.

The present invention just needs to be able to create a profile based on the above-mentioned transform model (printing model). Various configurations can be employed as well as the configuration to calculate Lab data from CMYKlclm data as mentioned above. For example, an available configuration can reference an LUT created based on the model.

Figure 13:
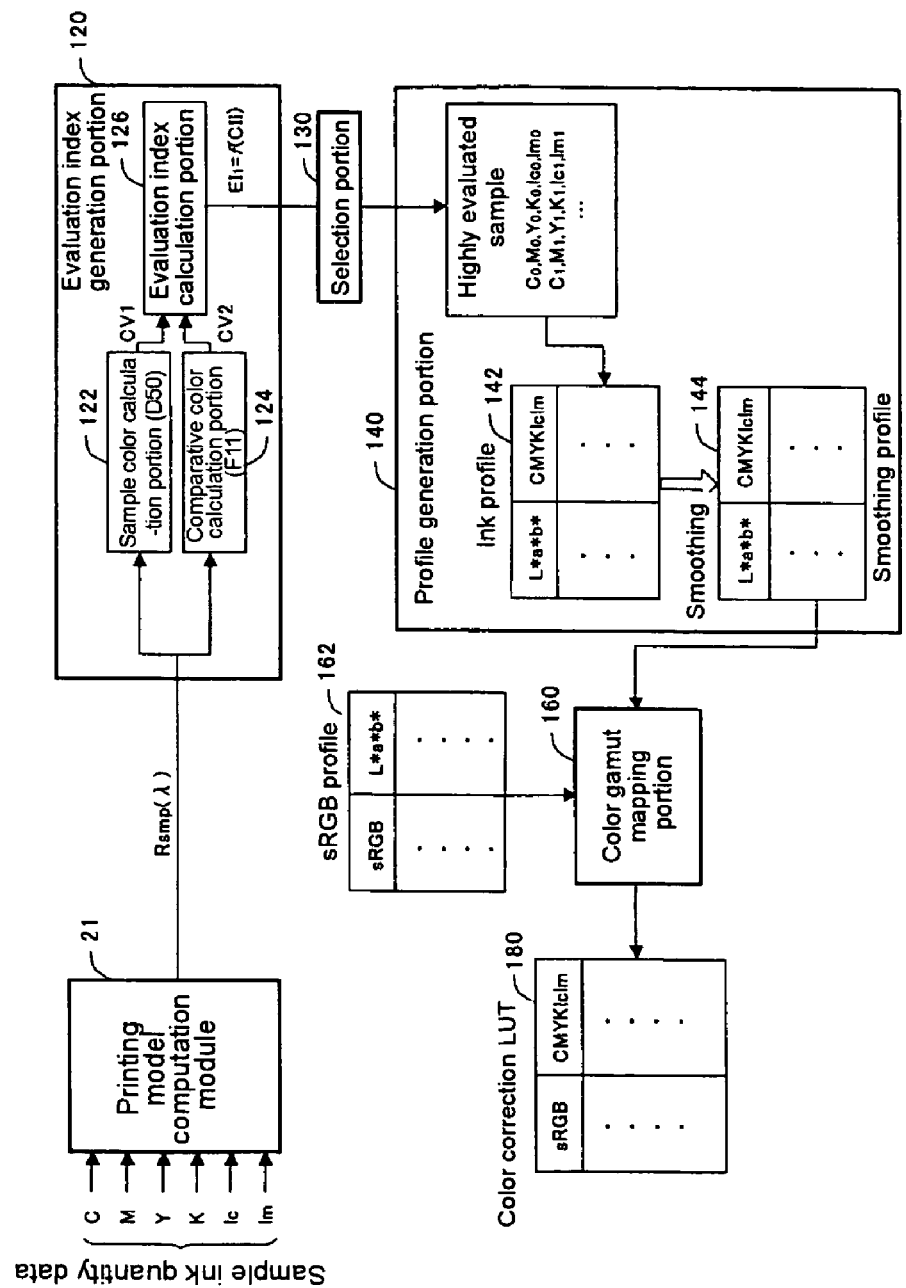
FIG. 13 is a block diagram showing another embodiment according to the present invention.

FIG. 13 is a block diagram showing a system for this purpose. The system is composed of the printing model computation module 21 similar to that mentioned above, a evaluation index generation portion 120, a selection portion 130, a profile generation portion 140, and a color gamut mapping portion 160. The printing model computation module 21 converts ink quantity data (CMYKlclm data) into spectral reflectance Rsmp (λ) of a color patch that is printed in accordance with the ink quantity data.

The evaluation index generation portion 120 includes a sample color calculation portion 122, a comparative color calculation portion 124, and a evaluation index calculation portion 126. The sample color calculation portion 122 uses spectral reflectance Rsmp(λ) for sample ink quantity data (multiple pieces of CMYKlclm data) to calculate color measurement value CV1 in a first viewing condition. The embodiment assumes standard light D50 to be the first viewing condition. A color may be represented by the color measurement value CV1 obtained under the first viewing condition. This color is also referred to as a "sample color." The comparative color calculation portion 124 uses spectral reflectance Rsmp(λ) for the sample ink quantity data to calculate color measurement value CV2 in a second viewing condition. The embodiment uses standard light F11 to be the second viewing condition. A color may be represented by the color measurement value CV2 obtained under the second viewing condition. This color is also referred to as a "comparative color" in the following description.

As seen from the above-mentioned description, the sample color calculation portion 122 and the comparative color calculation portion 124 according to the first embodiment use the same spectral reflectance Rsmp (λ) to respectively calculate color measurement values CV1 and CV2 under the different viewing conditions. The evaluation index calculation portion 126 uses these color measurement values CV1 and CV2 to calculate evaluation index $EI_1$ to determine whether or not the sample ink quantity data is good. An example of evaluation index $EI_1$ will be described late in detail.

The selection portion 130 selects sample ink quantity data having good evaluation index $EI_1$. The profile generation portion 140 creates an ink profile 142 using the selected sample ink quantity data and the color measurement value (Lab value) for a color patch printed through the use of the sample ink quantity data. The ink profile 142 is a lookup table indicating the correspondence between a color measurement value (Lab value) and a CMYKlclm ink quantity. Throughout this specification, the "profile" signifies an exemplification of rules to convert the color space and has a wide meaning including various device profiles and lookup tables.

The color gamut mapping portion 160 uses the ink profile 142 and a prepared sRGB profile 162 to create a color correction LUT 180. The sRGB profile 162 is used to convert the sRGB color space into the Lab color space. The color correction LUT 180 is a profile for converting sRGB data into CMYKlclm data.

The following describes an example of the above-mentioned process. Many virtual samples are to be configured so as to create the color correction LUT 180 in the above-mentioned system. The "virtual sample" signifies virtual ink quantity data used for the profile creation process and a virtual color patch to be printed in accordance with the ink quantity data. In the description to follow, the virtual sample is also referred to simply as a "sample." In the example, each ink of CMYKlclm is assigned with 11 ink quantities within the range from 0% to 100% in increments of 10%. All combinations of the six ink types are provided as virtual samples (sample ink quantity data). As a result, there are provided $11^6=1,771,561$ virtual samples. The "ink quantity 100%" signifies an ink quantity that is enough for printout using one type of ink.

When the virtual sample is specified, the printing model computation module 21 is used to convert the sample ink quantity data of each virtual sample into spectral reflectance Rsmp(λ). The printing model computation module 21 calculates color measurement value Lab of a CIELAB color coordinate system from the spectral reflectance Rsmp (λ). The example calculates a sample color's color measurement value based on viewing conditions of CIE standard light D50 and CIE 1931 2° observer. Of course, the sample ink quantity may be adjusted to uniformly distribute the sample color in the Lab space.

The Lab space is divided into many cells. Multiple sample colors are sorted with reference to the cells. The embodiment specifies evaluation index $EI_1$ so as to select a preferable sample from the cells in the Lab space. It just needs to provide an index for selecting a preferable sample. For example, equation (16) below can define the index.

[Equation 16]

$$EI_1 = f(CII) = k \cdot CII + \alpha \tag{16}$$

Here, CII signifies the Color Inconstancy Index, k is the coefficient, and α the other coefficients.

For example, the CII is formulated by equation (17) below.

[Equation 17]

$$CII = \left[ \left( \frac{\Delta L^*}{2S_L} \right)^2 + \left( \frac{\Delta C^*_{ab}}{2S_C} \right)^2 + \left( \frac{\Delta H^*_{ab}}{S_H} \right)^2 \right]^{1/2} \tag{17}$$

For details about the CII, see Billmeyer and Saltzman's Principles of Color Technology, 3rd edition, John Wiley & Sons, Inc, 2000, p. 129.

The right-hand side of equation (17) is equivalent to color difference ΔE*94 (2:2) in the CIE1994 color difference equation where luminosity and chroma coefficients $k_L$ and $k_C$ are set to value 2 and hue coefficient $k_H$ is set to value 1. According to the CIE1994 color difference equation, equation (18) below gives coefficients $S_L$, $S_C$, and $S_H$ for the denominator on the right-hand side of equation (17).

[Equation 18]

$$S_L = 1$$
$$S_C = 1 + 0.045 C^*_{ab} \quad (18)$$
$$S_H = 1 + 0.015 C^*_{ab}$$

It is possible to use another equation as the color difference equation used for calculating CII. The CII is defined as the difference in color appearance observed when a given color patch is viewed under first and second viewing conditions different from one another. Accordingly, a sample having a low CII is preferred in terms of less difference in apparent color when viewed under different viewing conditions. As an example, it is possible to use evaluation index $EI_1$ given by equation (19) below.

[Equation 19]

$$EI_1 = \frac{CII}{\max(CII)} + \frac{Tink}{6} \quad (19)$$

Here, max(CII) is the maximum CII value in all samples. $T_{ink}$ denotes the total quantity of ink used for the sample. When six types of ink are used 20% in terms of the ink quantity, for example, the value of $T_{ink}/6$ results in 120%/6=0.2. Total ink quantity $T_{ink}$ is closely related to the image quality. Decreasing total ink quantity $T_{ink}$ can improve the image quality. When the CII is almost the same, equation (19) provides a better (i.e., smaller) evaluation index $EI_1$ as total ink quantity $T_{ink}$ is decreased. Evaluation index $EI_1$ according to the first embodiment is not limited to that represented by equation (16) or (19). Any functions containing the CII can be used.

The above-mentioned CV1 and CV2 can be calculated as follows, for example. The sample color calculation portion 122 uses spectral reflectance Rsmp(λ) output from the printing model computation module 21 to calculate tristimulus value XYZ under the first viewing condition. Further, the chromatic adaptation transform is applied to this tristimulus value XYZ to calculate a corresponding color under the standard viewing condition. As an example, standard light D65 can be used as the light source under the standard viewing condition and CIECAT02 can be used as the chromatic adaptation transform. CIECAT02 is described in "The CIECAM02 Color Appearance Model", Nathan Moroney et al., IS&T/SID Tenth Color Imaging Conference, pp. 23-27, and "The performance of CIECAM02", Changjun Li et al., IS&T/SID Tenth Color Imaging Conference, pp. 28-31, for example. It is also possible to use any other chromatic adaptation transforms such as von Kries' prediction equation for chromatic adaptation. The obtained color measurement value is CV1 as mentioned above.

The comparative color calculation portion 124 also performs the same calculation as that of the sample color calculation portion 122 under the second viewing condition. The comparative color calculation portion 124 uses spectral reflectance Rsmp(λ) to calculate tristimulus value XYZ under the second viewing condition. The comparative color calculation portion 124 applies the chromatic adaptation transform to this tristimulus value XYZ to calculate a corresponding color under the standard viewing condition. The obtained color measurement value is CV2 as mentioned above.

The color measurement values CV1 and CV2 for sample colors are associated with the corresponding colors under the same standard viewing condition. The CII, i.e., color difference ΔE between them (see equation (17)), very accurately represents the difference in color appearance between the sample color and the comparative color. The standard viewing condition is not limited to standard light D65 and may employ a viewing condition under any illuminating light. When standard light D50 is used as the standard viewing condition, the chromatic adaptation transform is unneeded for sample colors. Calculation of CV2 performs the chromatic adaptation transform corresponding to standard light D50. However, the use of standard light D65 indicates the most reliable value as color difference ΔE that is calculated by using the CIELAB color coordinate system. In consideration for this, it is preferable to use standard light D65 as the standard viewing condition.

When the CII is calculated from CV1 and CV2 as mentioned above, the evaluation index calculation portion 126 uses two control device values CV1 and CV2 to calculate evaluation index $EI_1$ according to equation (19). Evaluation index $EI_1$ is calculated for all sample colors contained in each cell. Sample colors in the cell contain a sample whose evaluation index $EI_1$ is the best. The selection portion 130 selects that sample as a representative sample for the cell. As a result, one representative sample is selected for each cell that contains at least one sample. In the description to follow, the representative sample is also referred to as a "representative sample." The ink profile 142 results from the highly evaluated sample by making the correspondence between the CMYKlclm data and the Lab value (e.g., the color measurement value under the viewing condition of viewing a printout).

In the example, highly evaluated samples are obtained from many virtual samples. Decreasing cells in the Lab space can make the correspondence between many CMYKlclm data and Lab values. Accordingly, CMYKlclm can be accurately interpolated from Lab values. For this interpolation, a nonlinear interpolation may be used to adjust lattice positions before creating the ink profile 142. Alternatively, the ink profile 142 may be provided by calculating correspondences between all tone values.

In any case, the ink profile 142 is created based on the printing model computation module 21. Referencing the ink profile 142 can transform lattice points in the ink color space into lattice points in the device-independent color space. When equations (7) through (10) are used to correct lattice positions, let us suppose that the above-mentioned function M represents the relationship for obtaining the Lab value from the ink quantity by referencing the ink profile 142. The smoothing LUT can be created in the same manner as mentioned above.

When the smoothing LUT is created, the color gamut mapping portion 160 performs gamut mapping based on the ink profile 142 and the sRGB profile 162 to create the color correction LUT 180. This configuration makes it possible to create the color correction LUT 180 using ink quantity data with a small difference in color appearance under different viewing conditions as mentioned above. It is possible to decrease the difference in color appearance under different viewing conditions on a printout where the color transform is performed by referencing the color correction LUT 180. Of course, the evaluation index $EI_1$ can evaluate not only the color appearance under different viewing conditions as mentioned above, but also the other elements.

For example, data after halftoning may be calculated from CMYKlclm data to simulate a state where a printout is actually produced. In this manner, it is possible to define an evaluation index for evaluating the granularity of the printout. Let us assume the second term of equation (16) for evaluation index $EI_1$ to be an index to evaluate the granularity. The resulting CMYKlclm data can make the granularity unnoticeable. Accordingly, it is possible to create the color correction LUT 180 for yielding print results that suppress the granularity.

We claim:

1. A profile creation method of creating a profile which makes the correspondence between a lattice point in an ink color space composed of ink colors and a lattice point in a device-independent color space, the method comprising the steps of:
    defining by a computer a virtual force acting on a focused lattice point in a device-independent color space and obtaining the focused lattice position in a stable state reached when the virtual force acts on the focused lattice point; and
    working based on a transform model for transforming a lattice point in the ink color space into a lattice point in the device-independent color space to obtain a lattice point in an ink color space corresponding to a focused lattice position in the stable state and creating by a computer a profile by making correspondence between both,
    wherein the virtual force includes a resistive force whose magnitude is proportional to a speed for movement of the focused lattice point.

2. The profile creation method according to claim 1,
    wherein the virtual force includes a force reverse to a virtual force acting on an adjacent lattice point adjacent to the focused lattice point.

3. The profile creation method according to claim 1,
    wherein a focused lattice position in the stable state is obtained by defining the virtual force based on the focused lattice position and repeating a process to obtain a speed and a position of a focused lattice point after lapse of an infinitesimally small time interval based on this virtual force until the speed satisfies a specified condition.

4. The profile creation method according to claim 3,
    wherein a focused lattice position after lapse of the infinitesimally small time interval is corrected so as to be included in a color gamut within the device-independent color space resulting from transforming a given point included in the ink color space based on the transform model.

5. The profile creation method according to claim 3,
    wherein a focused lattice position along a color gamut boundary is corrected so as to approximately maintain luminosity and hue after lapse of the infinitesimally small time interval and to allow chroma to approximate to the maximum in the color gamut.

6. The profile creation method according to claim 4,
    wherein a lattice position is determined in accordance with the correction by providing a constraint condition so that a predetermined focused lattice point becomes hardly apart from a specific position in the device-independent color space.

7. The profile creation method according to claim 4,
    wherein the correction is available in any directions as long as a correction amount is within a predetermined allowable range.

8. The profile creation method according to claim 7,
    wherein the allowable range narrows as the time lapse.

9. The profile creation method according to claim 1, comprising:
    referencing the created profile and defining correspondence between a lattice point in the ink color space and a lattice point in a color space used for image data on a specified imaging device to create a color correction profile.

10. A profile creation apparatus to create a profile which makes the correspondence between a lattice point in an ink color space composed of ink colors and a lattice point in a device-independent color space, the apparatus comprising:
    a stable position acquisition means for defining a virtual force acting on a focused lattice point in a device-independent color space and obtaining the focused lattice position in a stable state reached when the virtual force acts on the focused lattice point; and
    a profile creation means for working based on a transform model for transforming a lattice point in the ink color space into a lattice point in the device-independent color space to obtain a lattice point in an ink color space corresponding to a focused lattice position in the stable state and creating a profile by making correspondence between both,
    wherein the virtual force includes a resistive force whose magnitude is proportional to a speed for movement of the focused lattice point.

11. A computer-readable storage medium having a profile creation program stored thereon, the profile creation program causing a computer to create a profile which makes the correspondence between a lattice point in an ink color space composed of ink colors and a lattice point in a device-independent color space, and the profile creation program causing the computer to implement functions comprising:
    a stable position acquisition function for defining a virtual force acting on a focused lattice point in a device-independent color space and obtaining the focused lattice position in a stable state reached when the virtual force acts on the focused lattice point; and
    a profile creation function for working based on a transform model for transforming a lattice point in the ink color space into a lattice point in the device-independent color space to obtain a lattice point in an ink color space corresponding to a focused lattice position in the stable state and creating a profile by making correspondence between both,
    wherein the virtual force includes a resistive force whose magnitude is proportional to a speed for movement of the focused lattice point.

12. A print control apparatus which references a color correction profile to transform colors for printing, the print control apparatus comprising:
    a memory in which program instructions are stored for execution by a processor, the program instructions causing the processor to create the color correction profile,
    wherein the color correction profile is data created by defining a virtual force acting on a focused lattice point in a device-independent color space, obtaining the focused lattice position in a stable state reached when the virtual force acts on the focused lattice point, obtaining a lattice point in an ink color space corresponding to a focused lattice position in the stable state based on a transform model for transforming a lattice point in an ink color space composed of ink colors into a lattice point in the device-independent color space, creating a profile by making correspondence between both, and specifying, based on the created profile, correspondence between image data processed in a printer and image data processed in a specific imaging device, wherein the virtual force includes a resistive force whose magnitude is proportional to a speed for movement of the focused lattice point.

13. A print control method of referencing a color correction profile to transform colors for printing, wherein the color correction profile is data created by defining a virtual force acting on a focused lattice point in a device-independent color space, obtaining the focused lattice position in a stable state reached when the virtual force acts on the focused lattice point, obtaining a lattice point in an ink color space corresponding to a focused lattice position in the stable state based on a transform model for transforming a lattice point in an ink color space composed of ink colors into a lattice point in the device-independent color space, creating a profile by making correspondence between both, and specifying, based on the created profile, correspondence between image data processed in a printer and image data processed in a specific imaging device, wherein each above step is performed by a computer;

wherein the virtual force includes a resistive force whose magnitude is proportional to a speed for movement of the focused lattice point.

14. A computer-readable storage medium having a print control program stored thereon, the print control program causing a computer to reference a color correction profile to transform colors for printing, and the print control program causing the computer to implement functions comprising:

an image data acquisition function for obtaining image data processed in a first imaging device;

a color transform function for performing a color transform process for the obtained image data by referencing a color correction profile created by defining a virtual force acting on a focused lattice point in a device-independent color space, obtaining the focused lattice position in a stable state reached when the virtual force acts on the focused lattice point, obtaining a lattice point in an ink color space corresponding to a focused lattice position in the stable state based on a transform model for transforming a lattice point in an ink color space composed of ink colors into a lattice point in the device-independent color space, creating a profile by making correspondence between both, and specifying, based on the created profile, correspondence between image data processed in a printer and image data processed in a specific imaging device; and a print control function for controlling a print apparatus based on data after color transform, wherein the virtual force includes a resistive force whose magnitude is proportional to a speed for movement of the focused lattice point.

\* \* \* \* \*